United States Patent
Thommana et al.

(10) Patent No.: US 9,282,500 B1
(45) Date of Patent: Mar. 8, 2016

(54) AD HOC HIGH FREQUENCY WITH ADVANCED AUTOMATIC LINK ESTABLISHMENT SYSTEM AND RELATED METHOD

(71) Applicants: John Thommana, Cedar Rapids, IA (US); Timothy E. Snodgrass, Palo, IA (US); Randy W. Nelson, Anamosa, IA (US); Lizy Paul, Cedar Rapids, IA (US); Dwayne E. Harris, Murphy, TX (US)

(72) Inventors: John Thommana, Cedar Rapids, IA (US); Timothy E. Snodgrass, Palo, IA (US); Randy W. Nelson, Anamosa, IA (US); Lizy Paul, Cedar Rapids, IA (US); Dwayne E. Harris, Murphy, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 37 days.

(21) Appl. No.: 14/307,069

(22) Filed: Jun. 17, 2014

(51) Int. Cl.
*H04W 40/02* (2009.01)
*H04W 84/18* (2009.01)
*H04W 24/08* (2009.01)
*H04W 40/12* (2009.01)

(52) U.S. Cl.
CPC ............. *H04W 40/02* (2013.01); *H04W 24/08* (2013.01); *H04W 40/12* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 7,092,402 B1 * | 8/2006 | Smith | ..................... | H04L 1/203 370/437 |
| 8,891,415 B2 * | 11/2014 | Powell, III | .......... | H04W 72/085 370/279 |
| 2008/0013564 A1 * | 1/2008 | Koski | ................ | H04W 74/0833 370/445 |
| 2008/0160928 A1 * | 7/2008 | Tsfaty | .................... | H04H 60/13 455/77 |
| 2008/0171561 A1 * | 7/2008 | Irony | .................. | H04W 76/025 455/466 |
| 2008/0181250 A1 * | 7/2008 | Koski | ................ | H04W 74/0808 370/445 |
| 2008/0198786 A1 * | 8/2008 | Nieto | .................... | H04L 1/1867 370/315 |
| 2012/0040618 A1 * | 2/2012 | Furman | ................. | H04W 28/18 455/62 |
| 2013/0077654 A1 * | 3/2013 | Deltour | ................ | H04B 1/7156 375/134 |
| 2013/0252558 A1 * | 9/2013 | Nieto | .................... | H04W 72/08 455/73 |
| 2014/0153674 A1 * | 6/2014 | Stratigos, Jr. | ........... | H04L 27/06 375/340 |
| 2014/0169199 A1 * | 6/2014 | Lamy-Bergot | ........ | H04W 24/08 370/252 |
| 2015/0249486 A1 * | 9/2015 | Stratigos, Jr. | ........... | H04L 27/06 370/328 |

* cited by examiner

*Primary Examiner* — Gregory Sefcheck
*Assistant Examiner* — Suk Jin Kang
(74) *Attorney, Agent, or Firm* — Angel N. Gerdzhikov; Donna P. Suchy; Daniel M. Barbieri

(57) ABSTRACT

A system and method for ad-hoc beyond line of sight high frequency (HF) radio frequency communication is disclosed. Embodiments of the present invention may augment the HF waveform incorporated with Advanced automatic link establishment ($A^2LE$) to determine relay-hop paths between a plurality of HF nodes. Systems herein may setup and tear-down bi-directional one hop HF communication sessions between two HF nodes having RF connectivity directly as well as through an intermediary relay node. Additionally, the setup and teardown may include bi-directional relay hop HF communication sessions between two HF nodes through multiple intermediary relay nodes. In performing the bi-directional relay hop HF communication sessions, systems herein may select a relay node, perform automatic link monitoring and link re-establishment, support message store and forward, and route HF communication along a path around potential barriers to communication (e.g., nuclear scintillation, solar flares, and coronal mass events).

20 Claims, 17 Drawing Sheets

| Node Id | Frequency | Router Node, Type | Node Type |
|---|---|---|---|
| N2 | X1<br>X8 | | Airborne |
| N3 | X2 | | Airborne |
| N4 | X3<br>X8 | F2, HFGCS<br>F2, HFGCS | Airborne |
| N5 | X4<br>X3<br>X1 to reach N2<br>X8 to reach N2 | N2, Airborne<br>N2, Airborne | Airborne |
| N6 | X2 to reach N3 | N3, Airborne | Airborne |
| F1 | X5 | | HFGCS |
| F2 | X3<br>X4 to reach N5<br>X3 to reach N5 | N5, Airborne<br>N5, Airborne | HFGCS |
| F3 | X5<br>X3 | F1, HFGCS<br>F2, HFGCS | HFGCS |
| NCS | X3<br>X5<br>X4 to get to N5 | F2, HFGCS<br>F1, HFGCS<br>N5, Airborne | HFGCS |

AD HOC HIGH FREQUENCY WITH ADVANCED AUTOMATIC LINK ESTABLISHMENT SYSTEM AND RELATED METHOD

FIELD OF THE INVENTION

The present invention relates generally to radio frequency communication between two or more stations. More particularly, embodiments of the present invention relate to maintenance of radio frequency communication link despite interferences and atmospherics normally inhibiting radio frequency communication.

BACKGROUND

Radio Frequency (RF) communication may provide long range communication for a plurality of stationary and moving nodes (stations). High Frequency (HF) RF may possess waveform qualities specifically suited for long range communication. In establishing a communication link between two nodes, traditional Automatic Link Establishment (ALE) techniques may generally support one hop (one point to one point) route communication link setup. For example, a one hop communication link may employ ALE to create a communication link between a HF node in San Francisco and a HF node onboard a distant ship sailing in the Indian Ocean.

Even though this one hop limitation does not hinder most of HF communication needs, it may be fatally disrupted during periods of atmospheric disruptions such as solar flares, nuclear events, and coronal mass ejections (CME).

In traditional systems, HF communication may be limited to air to ground, ground to ground, and ground to air communication. Airborne nodes are currently unable to communicate with each other even with positive RF connectivity.

Traditional HF operation also requires an operator to perform a link between the two points. The HF operator is needed since 1) a trained operator is needed to determine time of day, location, propagation conditions etc. required to setup an HF call; and 2) ALE techniques and HF waveform properties are distinct operations requiring intelligent human integration.

HF communication relies heavily on a RF transmission 1) transmitted from a surface or near surface station; 2) reflected by one or more layers of the atmosphere; and 3) received by the second surface or near surface station. During Solar Flares and CMEs 1) the D-layer of the atmosphere attenuation greatly increases; and 2) the E-layer becomes more refractive due to increased ionization densities. As a result, a signal may still reach the destination node with some level of attenuation and communication may still be possible. More likely during these disruptions, the signal is attenuated to a level that communication with the destination node is not possible.

One possible solution to this problem may include increased power at both transmitter and receiver. If the HF power amplifier at one or both locations had a spare power margin, power output may be increased to combat the effect of increased D-layer attenuation. Additionally, ALE may be employed to use higher frequencies that pass through the D and E layers much more easily. More likely, the E-layer is so ionized that the HF signal reflects off the E-layer and bounces back to earth preventing communication with the destination node.

Another possible solution may be to employ ALE to locate higher frequencies that pass through the E-layer to reflect off the F-layer. However, it is still very probable, even after increasing the HF power amplifier power output and going to a higher frequency, communication with the destination node will likely be impossible.

Nuclear explosions are man-made ionosphere disruptors which ionize the D-layer of the atmosphere to such an extent that HF communication may not be possible due to excessive increase in signal attenuation. The ionospheric disruption by a nuclear event may be temporary and confined to a radius of a few hundred miles. HF transmissions attempted through this disrupted area may be impossible during the ionization. As in the natural events, during the time after a nuclear event, there is a very high probability that ALE may not be able to find a direct one hop path between surviving HF communication nodes.

Sunlight also affects the layers of the atmosphere and thus, the reflective properties thereof. During the day, the increased attenuation due to sunlight radiation impacting the ionosphere may last for as long as 6 to 8 hours while during the night, the increased attenuation may last for up to 30 minutes after sunset. During normal movement of the sun, D-layer attenuation is locally present during daylight, with D layer locally disappearing during the night and the E-layer typically disappears (locally) during night time leaving only the F-layer.

In addition to natural and man-made disruptions to the atmosphere, HF communication may be limited by traditional ALE methods. Because propagation of RF signals at HF frequencies is complex and involves multiple variables including 1) receiver and transmitter locations with respect to the Sun, 2) the frequency, and 3) the Smoothed Sunspot Number. Conventional methods have utilized ALE protocols to find suitable frequencies allowing reasonable communication rates between two nodes.

Certain critical limitations of ALE in the past have continued into the current generation ALE. This weakness or flaw in current methods may include that ALE, as a function, is evoked under one of two conditions either: 1) to find a suitable frequency on which to communicate, or 2) after the communication link has degraded and failed, ALE is again evoked to find a new frequency upon which a new channel may be built. This frustrating degradation and failure causes a break in HF communication causing time delays and missed communication opportunities.

This paradigm of waiting until the link collapses continues to plague HF capabilities since each user knows with certainty that unless both the users and the Sun remains stationary, whatever link is being used will certainly fail during the period of transmission. Many users resort to more expensive space based methods of long range communication.

Some traditional line of sight (LOS) communication methods maintain a communication link by changing a frequency or a base transmitter before a signal may deteriorate to a point of failure. These LOS methods lack an ability to function in a Beyond Line of Sight (BLOS) network of prearranged nodes.

Therefore, a need remains for a relay-hop routing mechanism using advanced ALE via intermediate nodes to reach the end user. This novel approach where ALE and waveform is integrated may reduce or eliminate need for an operator and allow successful communication worldwide.

SUMMARY

Accordingly, a method for ad-hoc beyond line of sight radio frequency communication may comprise receiving, by a first communication node associated with a first system, a first radio frequency signal indicative of at least one of: at least one communication node identification data, at least one communication node position data, at least one communication node type data, frequency data, periodic sounding data, and solar data, generating a first connectivity matrix of communication nodes available to the first system, each communication node of the first connectivity matrix in direct radio frequency communication with the first communication node via the first radio frequency signal, the generating via an advanced automatic link establishment module.

The method may store the first connectivity matrix of communication nodes in a memory associated with the first system, querying a second system associated with a second communication node via the advanced automatic link establishment module, the second communication node one of the communication nodes in the first connectivity matrix of communication nodes, the querying to obtain a second connectivity matrix of communication nodes 1) available to the second system via a second radio frequency signal, 2) generated by the second system, and 3) stored by the second system, receiving the second connectivity matrix of communication nodes available to the second system via the first radio frequency signal, availing the first connectivity matrix of communication nodes to the second system.

The method may determine a path for bi-directional communication between the first communication node and a third communication node, the third communication node 1) associated with a third system and 2) one of the communication nodes in the second connectivity matrix of communication nodes determined by the second system, bi-directionally communicating with the third communication node via the path, the path including the first radio frequency signal between the first communication node and the second communication node and relayed by the second communication node to the third communication node via the second signal, periodically updating the first connectivity matrix of communication nodes via the advanced automatic link establishment module, and periodically querying the second communication node for an updated second connectivity matrix of communication nodes.

An additional embodiment of the present invention may include a method wherein each connectivity matrix of communication nodes further comprises a node identification, a node connection frequency, a node type, a router type, and an indicator of node capability.

An additional embodiment of the present invention may include a method wherein the first system associated with a first communication node is further configured to transmit and receive the first radio frequency signal via a transmitter receiver and to process the received first radio frequency signal via a session manager.

An additional embodiment of the present invention may include a method wherein the first radio frequency signal is a signal configured for beyond line of sight propagation and comprises one of: a high frequency signal and a very low frequency signal.

An additional embodiment of the present invention may include a method wherein the first system further comprises an electronically scanned array antenna element.

An additional embodiment of the present invention may include a method wherein the advanced automatic link establishment module operates on one of: a time shared basis with the first communication node while the first communication node is idle.

An additional embodiment of the present invention may include a method wherein the first radio frequency signal is routed via a first transmitter receiver and the second radio frequency signal is received via a second receiver.

An additional embodiment of the present invention may include a method wherein periodically updating the first connectivity matrix is based on at least one of: node speed, node relative sun speed, a determined presence of a radio frequency propagation inhibitor, and an indication of signal degradation.

An additional embodiment of the present invention may include a method wherein the indication of signal degradation further comprises: monitoring a quality of the first radio frequency signal, determining a reduction in signal quality based on one of package error rate and a message error rate, generating an alternate path before the reduction in signal quality reaches a threshold, and bi-directionally communicating with the third communication node via the alternate path.

An additional embodiment of the present invention may include a system for ad-hoc beyond line of sight radio frequency communication, comprising: a first communication node including a transmitter receiver configured for transmission and reception of a first radio frequency signal, a node finding module associated with the first communication node, the node finding module configured for determining communication nodes available to the first communication node, the communication nodes in direct communication with the first communication node via the first radio frequency signal, the determining including receiving, via the first radio frequency signal, at least: node identification data, node position data, node type data, frequency data, periodic sounding data, and solar data associated with each communication node, an advanced automatic link establishment module associated with the first communication node, the advanced automatic link establishment module for generating a first connectivity matrix of communication nodes available to the first communication node, in the first connectivity matrix based on data received from the node finding module, the advanced automatic link establishment module further configured for querying a second system associated with a second communication node, the second communication node one of the communication nodes in the first connectivity matrix of communication nodes, the querying to obtain a second connectivity matrix of communication nodes 1) available to the second system, 2) generated by the second system, and 3) stored by the second system, each node of the second connectivity matrix of communication nodes in direct radio frequency communication with the second communication node via a second radio frequency signal, the second connectivity matrix based on receiving, via the second radio frequency signal, at least: node identification data, node position data, node type data, frequency data, periodic sounding data, and solar data associated with each node in the second connectivity matrix, a memory configured at least for receiving and storing the first connectivity matrix and the second connectivity matrix, the memory configured for availing the first connectivity matrix of communication nodes to the second system, an ad-hoc routing module for determining a path for bi-directional communication between the first communication node and a third communication node, the third communication node 1) associated with a third system and 2) one of the communication nodes in the second connectivity matrix of communication nodes determined by the second system, a waveform for bi-directionally communicating with the third communication node via the path, the path including the first radio frequency signal between the first communication node and the second communication node and relayed by the second communication node to the third communication node via the second signal, each of the first communication node, the node finding module, the advanced automatic link establishment module, the memory, the ad-hoc routing module, the waveform manager, and a session manager configured for data communication associated with the first communication node, the session manager for periodically updating: the first connectivity matrix of communication nodes via the advanced automatic link establishment module and periodically querying the second communication node for an updated second connectivity matrix of communication nodes.

An additional embodiment of the present invention may include a method for ad-hoc beyond line of sight radio frequency communication, comprising: means for generating a first connectivity matrix of communication nodes available to a first system associated with a first communication node, each node of the first connectivity matrix in direct radio frequency communication with the first communication node via a first radio frequency signal, means for storing the first connectivity matrix of communication nodes, means for querying a second system associated with a second communication node, the second communication node one of the communication nodes in the first connectivity matrix of communication nodes, the querying to obtain a second connectivity matrix of communication nodes 1) available to the second system, 2) generated by the second system, and 3) stored by the second system, each node of the second connectivity matrix of communication nodes in direct radio frequency communication with the second communication node via a second radio frequency signal, means for receiving the second connectivity matrix of communication nodes available to the second system and availing the first connectivity matrix of communication nodes to the second system, means for determining a path for bi-directional communication between the first communication node and a third communication node, the third communication node 1) associated with a third system and 2) one of the communication nodes in the second connectivity matrix of communication nodes determined by the second system, means for bi-directionally communicating with the third communication node via the path, means for periodically updating the first connectivity matrix of communication nodes via the advanced automatic link establishment module, and means for periodically querying the second communication node for an updated second connectivity matrix of communication nodes.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 7 a connectivity matrix indicating exemplary node communication status created by one embodiment of the present invention;

DETAILED DESCRIPTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention may augment the HF waveform incorporated with Advanced ALE ($A^2LE$) to determine relay-hop paths between a plurality of HF nodes. Systems herein may setup and teardown bi-directional one-hop HF communication sessions between two HF nodes having RF connectivity. In some embodiments, setup and teardown of bi-directional two hop HF communication sessions between any two HF nodes may also be directed through an intermediary relay node or nodes. Additionally, the setup and teardown may include bi-directional relay-hop HF communication sessions between two HF nodes through multiple intermediary relay nodes. In performing the bi-directional relay-hop HF communication sessions, systems herein may select a relay node, perform automatic communication link monitoring and communication link re-establishment, support message store and forward, and route HF communication around potential barriers to communication (e.g., nuclear or natural scintillation, solar flares, CME).

Additional embodiments of the present invention may employ $A^2LE$ including ionospheric propagation prediction tools combined with HF signaling protocols to maintain a constant awareness of available potential HF communication paths. Embodiments herein may, without user intervention, sense a degradation in signal to noise (SNR) of an in-use HF BLOS channel and proactively choose to move to a second HF frequency or node path to prevent breakage of the user's HF communication link. This introduction of a "Make Before Break" protocol may prevent loss of a valuable HF communication link.

FIG. 1

Figure 1:
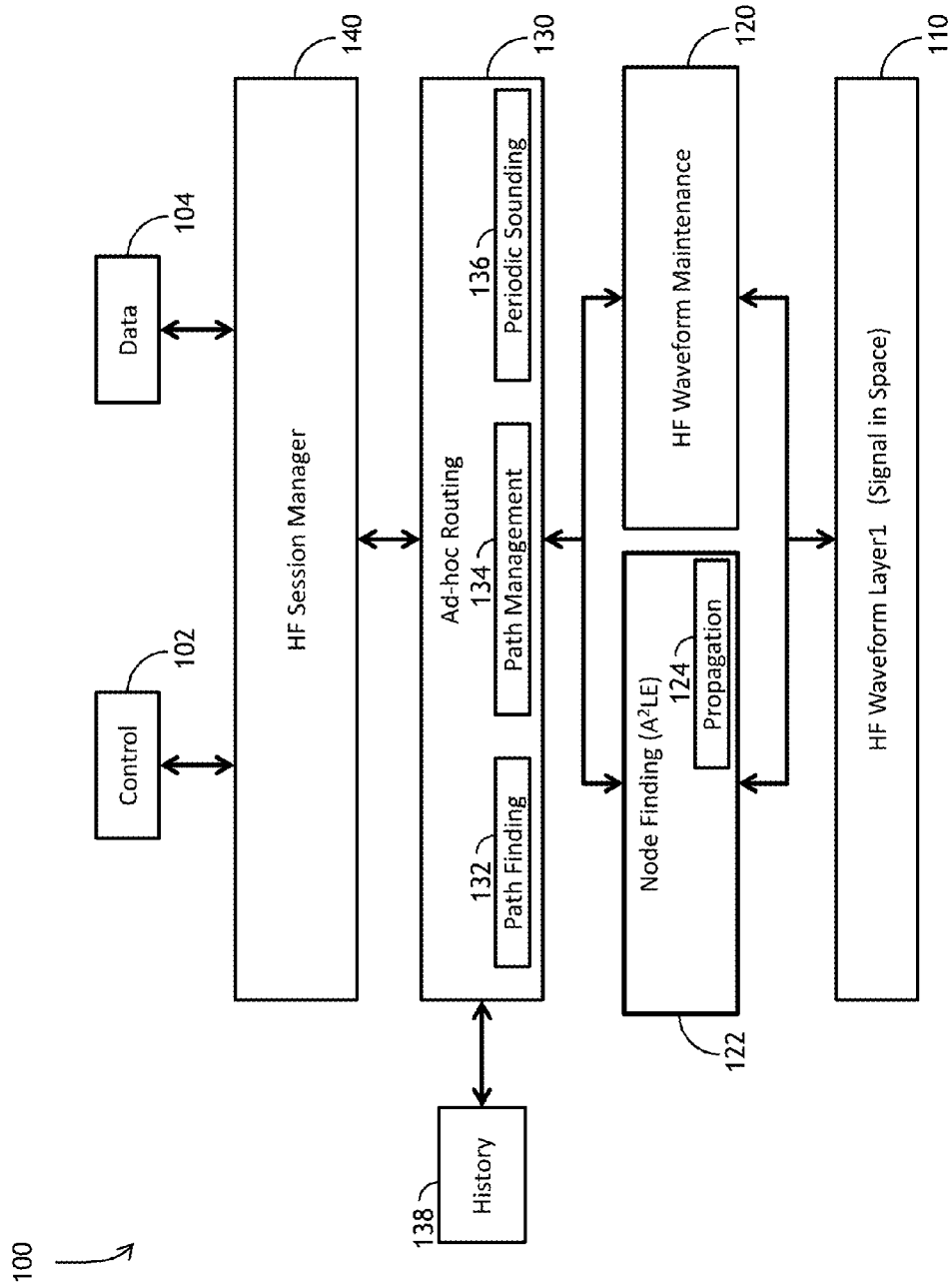
FIG. 1 is a diagram of a system for Ad-Hoc HF in accordance with an embodiment of the present invention.

Referring to FIG. 1, a diagram of a system for Ad-Hoc HF in accordance with an embodiment of the present invention is shown. System 100 may operate as a system employed onboard a vehicle in motion as well as within a stationary location to manage ad-hoc HF. System 100 may include a layered approach to exemplary describe the inventive concepts disclosed herein. One layer may include an HF waveform 110 including the actual signal in space transmitted by an RF antenna at a first node and received by an RF antenna at a second HF station. This HF waveform 110 may possess a plurality of well-known waveform manipulation configurations to transmit data from the first station to the second. For example, one HF waveform may transmit a digital signal including a Controller Pilot Data Link Communications (CPDLC) signal.

Integrating $A^2LE$ with HF Waveform

System 100 may employ digital processing technology to simultaneously operate $A^2LE$ and the HF waveform within the single system. The integration of $A^2LE$ into the HF waveform may operate $A^2LE$ as a second layer function. The second layer may include a node maintenance capability including a node finding mechanism 122 via $A^2LE$. The node finding mechanism 122 may include determining each available node within a one hop range of the current node. Some of the $A^2LE$ function available to system 100 may include $A^2LE$ Sounding, $A^2LE$ Call, and A2LE Answer Messages to enable ad-hoc HF.

Additionally the second layer may include HF Waveform maintenance 120 to provide continuous maintenance of the HF waveform to/from each available node.

A third layer may include an ad-hoc routing module 130 to maintain a continuously updated path available for an HF connection between the first node and the second node. The ad-hoc routing module 130 may further include path finding 132, path management 134, and periodic sounding 136 to determine whether a new path may become available. In embodiments, system 100 may periodically direct ad hoc routing module 130 to sound for the local nodes able to successfully connect within the one hop range of the system 100 node. In embodiments, system 100 may direct periodic sounding 136 at periods depending on the speed with which conditions affecting communication may change. In an HF environment, conditions affecting communication may require a sounding at intervals no greater than every 15 minutes. Due to the speed of the platform on which system 100 is employed (e.g., a surface ship traveling at 20 knots), conditions affecting HF communication (sun angle, weather systems, solar events) may change infrequently.

Conversely, an aircraft traveling east into the Sun may require periodic sounding 136 more frequently. Due to the speed relative to the Sun and the speed relative to changing atmospheric conditions, a higher speed vehicle tracking in a specific direction may require more frequent periodic soundings 136.

Vehicle position may further affect the period with which system 100 directs periodic sounding 136. A vehicle near the equator may require more infrequent soundings than a vehicle in motion near either of the poles.

In addition, a history 138 of successful paths associated with positions and times may function as a portion of ad-hoc routing 130. For example, a specific bi-directional relay-node path from a first node to a second node may have proven operational at a specific time at a specific location. Ad-hoc routing may maintain the history 138 of such a successful path to enable employment in the future.

An additional layer may include a HF session manager 140 which system 100 may task with control and management of ad-hoc HF. System 100 may employ the HF session manager 140 to operate $A^2LE$ and the HF waveform in a time shared mode. In embodiments, system 100 may operate $A^2LE$ periodically when the radio is idle and no communication sessions are in progress. Alternately, system 100 via session manager 140 may operate A2LE as needed during a session.

Independent distal but cooperative session managers 140 associated with separate systems worldwide may enable system 100 to effectively communicate through ad-hoc HF. A session manager 140 acting as a proxy for the operator may operate associated with a first node may negotiate with a session manager 140 operating within a second node to 1) pause HF communication, 2) run $A^2LE$ to update the available connectivity nodes, and then 3) resume communication.

In embodiments, the session manager 140 may control when $A^2LE$ is active and when the HF Waveform is active. Session Manager 140 may operate to prevent a break in RF connectivity via $A^2LE$ interruption in communication to identify available nodes and determine a new signal path, and then recommence operation of the communication link.

Additionally, embodiments of system 100 may augment the control interface to accept specific parameters associated with propagation prediction systems outlined below. For example, current position, time, prediction models (e.g., PropMan, Nuclear Scintillation etc.) may enable the system 100 to perform all functions previously performed by an operator.

The HF Session Manager 140 may perform all the various functions needed to setup and tear down an HF session between two nodes. In embodiments, HF session manager 140 may incorporate multiple prediction tools to determine channel degradation under different conditions as well as use of at least one of the prediction tools during an active communication session.

In addition to the prediction tools, session manager 140 may gather information from a plurality of sources to determine a current propagation snapshot of available paths for the desired signal. For example, session manager may listen for a Non-Directional Beacon (NDB) transmitted from a remote part of the world to determine if propagation is possible in a specific direction. As a further variable in signal prediction, session manager 140 may track a packet error rate of a signal in progress to determine HF signal degradation.

Session manager 140 may operate to maintain flexibility in dynamically routing a signal from the first node A to the target node C via a plurality of dynamically determined node paths. Session manager 140 may determine a first path from node A to node C through nodes B1, B2, B3. After the message is sent by node A and node B2 becomes jammed, session manager 140 may allow the flexibility to route the signal along a path through nodes B4 and B5 to reach node C. This flexibility to dynamically route the signals along a plurality of paths may ensure accurate and reliable communication between nodes A and C. In this manner, session manager 140 may temporarily hold a message for delivery via the alternate path as the alternate path may become available.

In one embodiment, session manager 140 may employ a link break timer to dynamically determine a time associated with the likely end of a communication link and generate and switch to an alternate path for the signal to continue before the communication link is broken.

In another embodiment, session manager 140 may select frequencies which have a higher probability of maintaining a stable communication link under the specific conditions (e.g., range, target node B position, expected interference from historical models, predicted interference, predicated interference based on measured nuclear data). In this manner, session manager 140 may operate to shorten the session setup time and communication link reestablishment process.

In additional embodiments, session manager 140 may prune a selective connectivity table during an interference event (e.g. solar flare, nuclear). If session manager may determine a specific node is near a nuclear event zone, it can predict the atmospheric conditions in the neighborhood and react accordingly (e.g., eliminating downwind nodes).

Inputs to HF session manager 140 may include a control input 102 via an input/output device from a user and data 104 input/output between the session manager 140 and the user. Control 102 may include a plurality of control inputs focused on operational control of a desired communication message (e.g., CPDLC, weather imagery, target imagery). Data input 104 may include a plurality of data entry parameters for the user to interact with session manager 140.

Relay-Hop HF Routing

As used herein, NodeA may be described as the node associated with system 100 onboard a platform. NodeA may be able to communicate with an offboard NodeB via a one-hop transmission. NodeA may further be able to communicate with NodeC via relay-hop ad-hoc HF as directed by session manager 140.

In embodiments, session manager 140 may employ A²LE and Ad-hoc Routing to:
a. Find HF Nodes
b. Determine Routes to identified HF Nodes
c. Setup/Teardown bi-directional one hop HF communication sessions between any two HF Nodes that has RF connectivity
d. Setup/teardown bi-directional two hop HF communication sessions between any two HF nodes through an intermediary relay node
e. Setup/Teardown bi-directional relay hop HF communication sessions between two HF nodes through multiple intermediary relay nodes
f. Relay node selection
g. Automatic communication link monitoring
h. Automatic communication link re-establishment
i. Message store and forward and
j. Routing around communication holes (Nuclear Scintillation, Solar Flares, and CME).

FIG. 2

Figure 2:
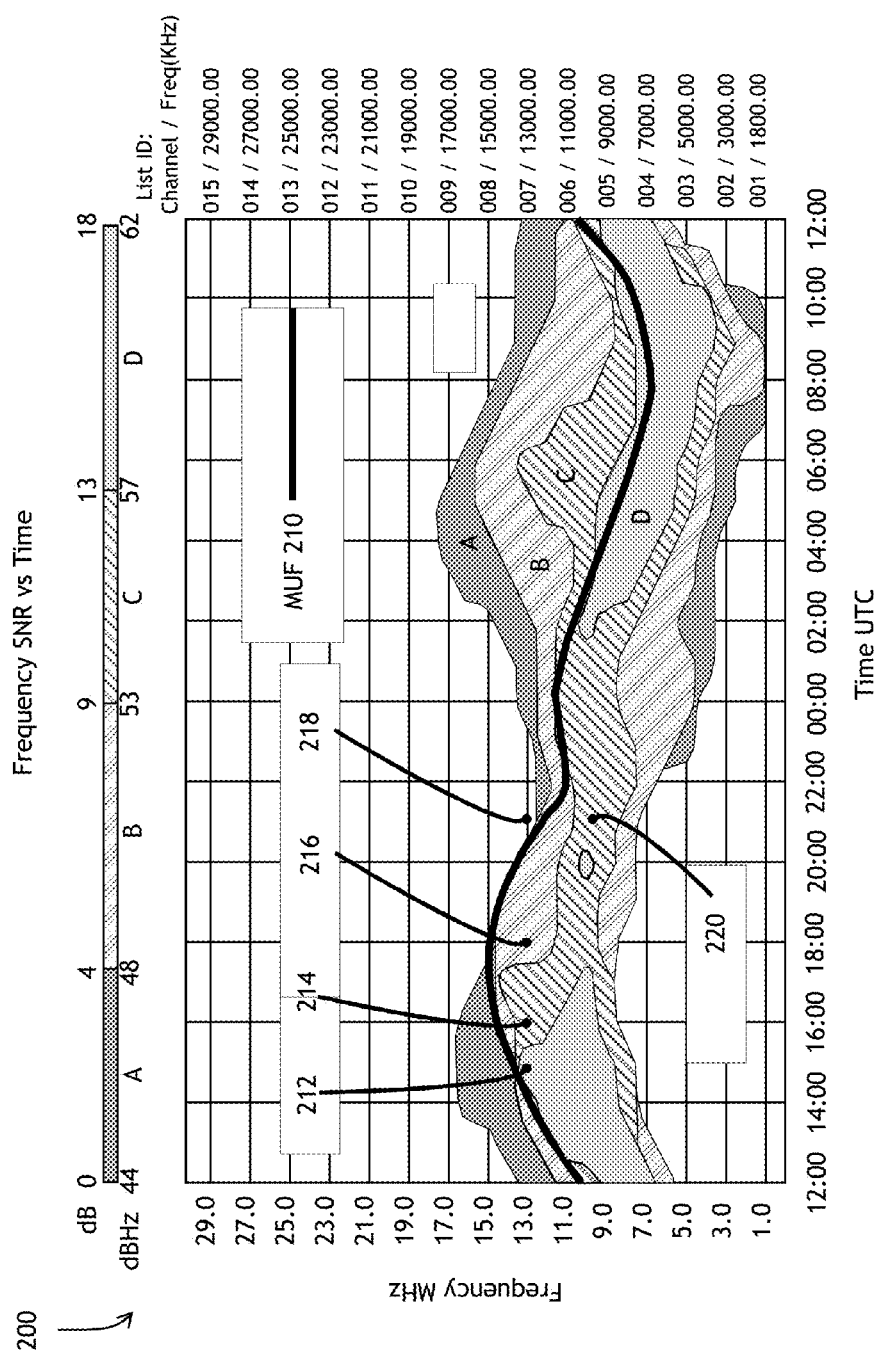
FIG. 2 is a graph of frequency versus time and associated HF propagation usable by an embodiment of the present invention.

Referring to FIG. 2, a graph of frequency versus time and associated HF propagation usable by an embodiment of the present invention is shown. A²LE may employ a plurality of propagation management tools to determine a suitable path for the one hop communication between NodeA and a nearby NodeB. A result of one such propagation tool is indicated in FIG. 2. FIG. 2 may indicate a plurality of data including a Maximum Usable Frequency (MUF) over time as indicated by black line 210. Dark grey shaded areas "A" may indicate a poor quality signal with 0-4 dB above the noise. Lightly hashed areas "B" may indicate a signal of medium quality with 4-9 dB above the noise. A heavy hashing "C" may indicate a signal quality of 9-13 above the noise and a lightly shaded areas "D" may indicate the best quality signal of 13-18 dB above the noise.

Because of the complexity of the "channel" or the radio frequency "path" between NodeA and NodeB (e.g., two HF radios) a hundred or four thousand miles apart, system 100 may employ software tools to aid in prediction of frequencies which will provide connectivity between the two nodes as a function of time. As used herein, a path may be defined as a physical path a signal in space may travel from a first node to a second node, including each intermediate node. As used herein, to route a signal is defined as the action of routing a signal along a specific path. As used herein, a communication link is defined as the connection between the two distant nodes enabling transfer of data over the signal in space. As used herein a one hop link may be defined as a transmission by a node on or near the earth surface, a reflection from the ionosphere, and a reception by a node on or near the earth surface. A relay-hop link may be defined as a one hop link between two nodes relayed by the receiving node to a third node via a second one hop link. A multi-hop is defined as multiple reflections from the ionosphere and the earth's surface to reach a receiver node. Further a multi-cast may include a transmission from a single node designed for reception by multiple distally separated receiver nodes.

The shading at the top of the graph may define a strength of the desired signal compared to the noise and is plotted as a function of time (UTC). For example, if a communication link starts at 1500 UTC on 13 MHz 212 that it is a "light grey" quality communication link with 13-16 dB of signal above the noise. An hour later at 1600 UTC, however, 13 MHz 214 has degraded as indicated by the heavy hashed C. By 1800 hours the signal at 13 MHz 216 is only 4-9 dB above the noise as indicated by the lightly hashed B. At 2100 hours the signal on 13 MHz 218 has disappeared as indicated outside all shading, dropping below the ambient HF noise level. This product may indicate, at 2100 hours, there is still quite acceptable connectivity available on 9 MHz 220 and the communication link would not have to have broken.

System 100 may incorporate these propagation predicting algorithms 124 within system 100 to prevent the communication link from breaking before the quality of the signal degrades to a point where communication is impossible.

System 100 may further operate A²LE at times when the radio is not being used by the host for active communication. System 100 may direct A²LE to use the radio to interrogate other A²LE equipped radios to maintain a current "connectivity table" usable to connect with other HF nodes when necessary to build a channel for greater than one hop communication.

In embodiments, system 100 may direct A²LE to predict a second path of communication should a user require a long term (20-30 minutes) session where a possible degradation may interrupt the communication link. In this manner, system 100 may store a plurality of communication paths available to the user and a plurality of communication paths available at a desired period in the future. Should the signal degrade during the long term session, system 100 may direct a transfer to one of the alternately planned paths mid-session to proactively prevent a communication link break.

Because communication nodes onboard mobile platforms may use half-duplex radios, this task of finding another HF radio somewhere in the world may be a non-trivial task. This is because:
a. HF waveforms do not utilize knowledge of absolute time (e.g. UTC) and (solar) time affects which frequencies will be operational
b. Communication to a particular radio can be successful within a limited frequency range c. The location of the target node isn't known, and that also affects which frequency will work d. That particular node may be busy sending traffic and cannot receive or respond to an interrogation System 100 may provide enhanced sounding to determine available nodes capable of communicating with the target node. Although A2LE may operate while the associated node.

While A²LE is running, it may passively and actively receive and transmit (not initiating a transmission) and steps through an A²LE connectivity list to determine if another radio running A²LE might be transmitting an interrogation either to its specific address, or a broadcast interrogation to any listening node. If session manager 140 receives an A²LE interrogation (either directed to itself, or a general broadcast to any node), it will respond with its A²LE data (position, velocity vector signal strength, along with other channel quality and availability parameters) as well as reporting all the other HF nodes with which it has connectivity. A²LE will not build a channel, but will rather store and update its own connectivity matrix with the information supplied by the responding nodes.

In this manner, session manager 140 may continuously track what other nodes with which it has connectivity as well as what nodes maintain connectivity with the one-hop neighbors. Session manager 140 may initiate A²LE as determined by possible waveform degradation to determine an updated connectivity matrix.

Of note, A²LE communication and sounding may be separate from the actual connectivity and transmission of data accomplished by the waveform. One goal of A²LE is the concept of gathering and maintaining real-time one and two hop connectivity information over HF to enable session managers 140 to prevent the breaking of a communication link.

FIG. 3

Figure 3:
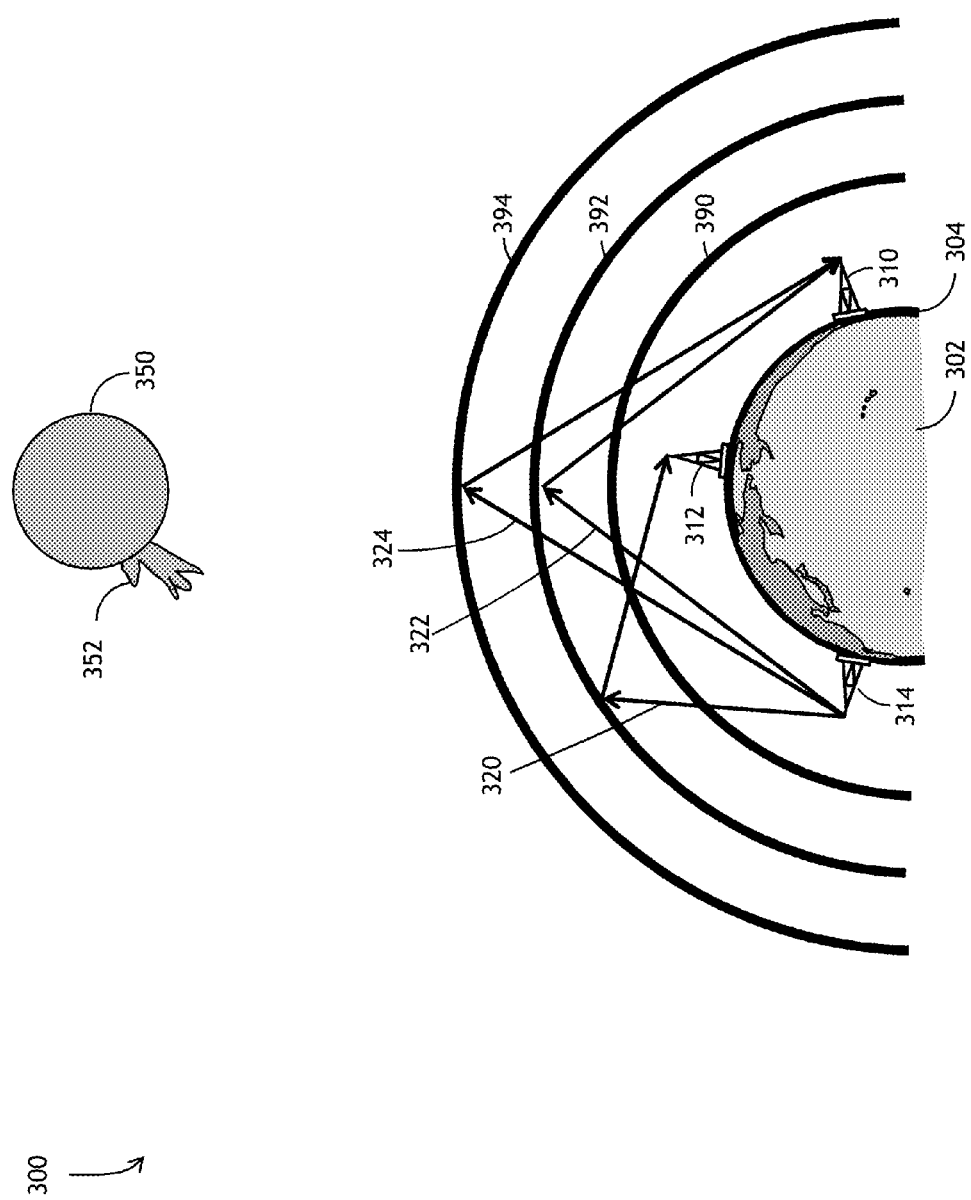
FIG. 3 is a diagram of exemplary layers of the atmosphere employed by embodiments of the present invention.

Referring to FIG. 3, a diagram of exemplary layers of the atmosphere employed by embodiments of the present invention is shown. Reflective communication may transit from a first transmission ground based node 314 to one or more of a second ground based node 312 and a third ground based node 310. Around the earth 302 communication ground based nodes 310 312 314 may operate on or near the surface 304. A first signal 320 may emit from first ground based node 314, reflect from the E-layer of the atmosphere 392 and arrive at second ground based node 312. A second transmission 322 of an alternate frequency may possess a greater range able to pass through the D-layer 390 and reflect from the E-layer 392 for arrival at third ground based node 310. A third transmission 324 of at a third frequency may traverse both D and E layers 390 392 to reflect from the F-layer 394 for arrival at third ground based node 310. Solar flare 352 emanating from the sun 350 may disrupt reflective and transmissive capabilities of one or more of the layers 390 392 394.

System 100 may provide not only an alternate path between a plurality of nodes but also an alternate path based on frequency and a desired layer of the atmosphere from which to reflect the signal. For example, based on the presence or absence of the sun, system 100 may direct communication on a specific frequency to pass through the D-layer 390 and reflect from the E-layer 392. Similarly, a selection of a higher frequency may offer a longer range by allowing the higher frequency to pass through the D and E layers 390 392 and reflect from the F-layer 394 for increased range. As these layers may move and change relative to the surface of the earth, system 100 may continuously update the requirements (e.g., frequency, path, node usage) to ensure the communication link is maintained.

FIG. 4

Figure 4:
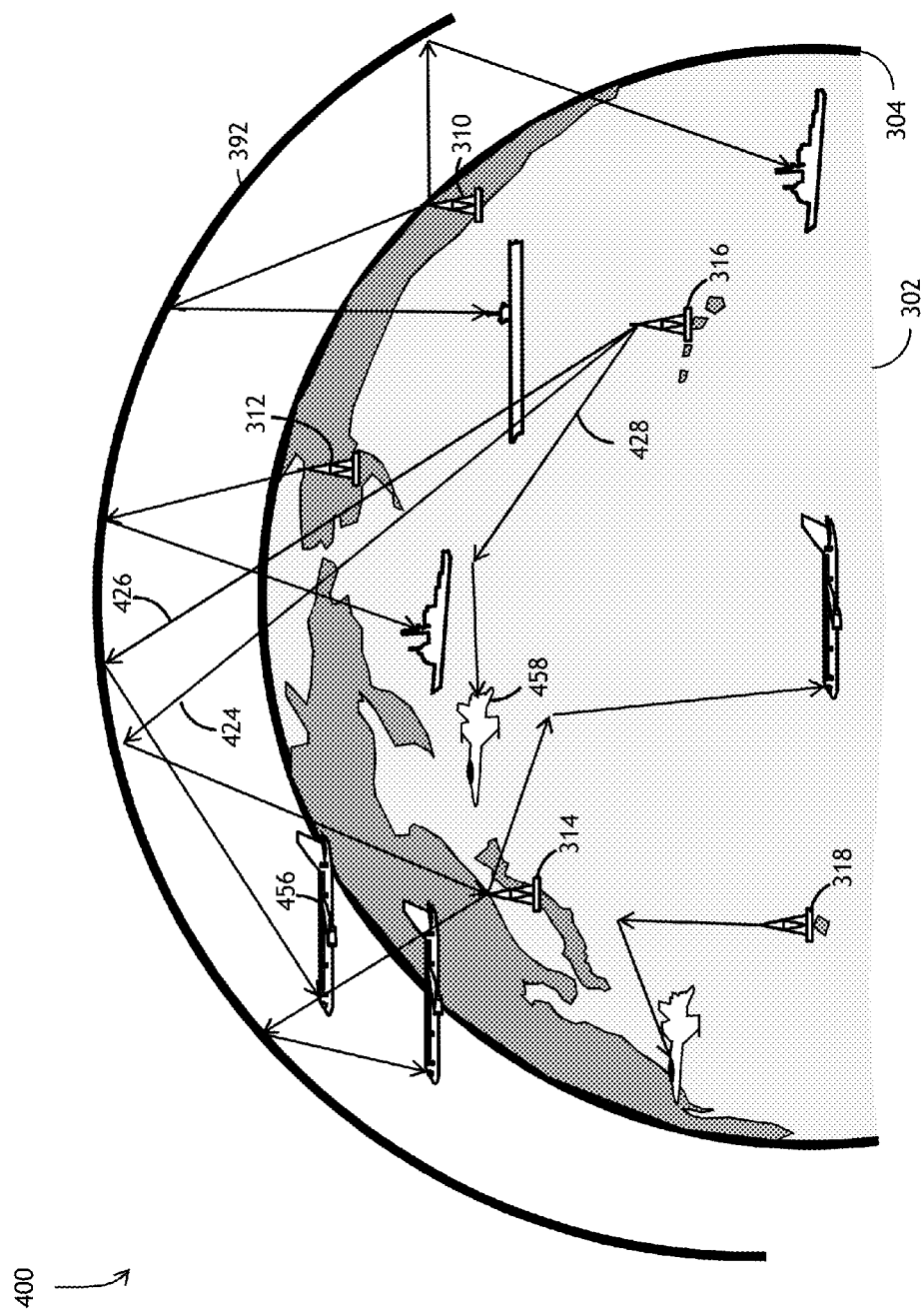
FIG. 4 is an diagram of a HF communication network used by one embodiment of the present invention.

Referring to FIG. 4, a diagram of a HF communication network used by one embodiment of the present invention is shown. Stationary ground based first 314 second 312 and third 310 nodes in addition to remote ground based nodes 316 and 318 may transmit and receive signals to and from around the world. Embodiments of system 100 may operate within these stationary and mobile nodes. For example, remote ground based node 316 may transmit a first signal 428 to a mobile node onboard airborne entity 458 in the Pacific, a second signal 426 to a mobile node onboard second airborne entity 456 over Russia, and to first ground based node 314 in Japan via third signal 424. Each of these nodes onboard the airborne entities may operate an embodiment of system 100 to ensure continuous and quality communication. Each of these signals is refracted from and reliant upon D-layer 390 at a specific frequency for the sun time of day to reach the intended destination. These point to point paths however, are vulnerable to disruptive events.

FIG. 5

Figure 5:
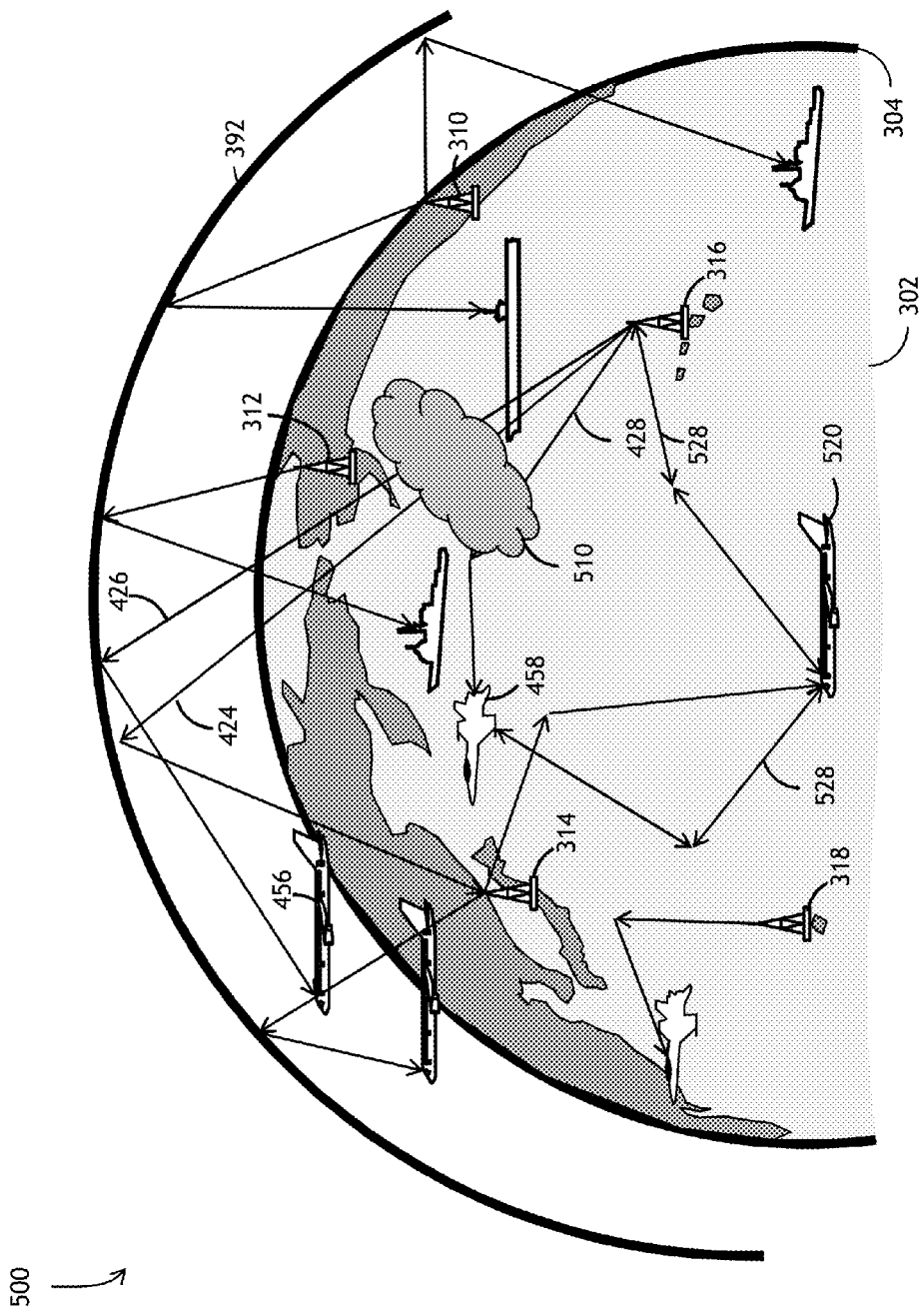
FIG. 5 is a diagram of an alternate HF communication network created by one embodiment of the present invention.

Referring to FIG. 5, a diagram of an alternate HF communication network created by one embodiment of the present invention is shown. Should a disruptive event 510 cause a break in available communication paths, system 100 may route the path of communication from the original one hop path to an alternate relay-hop path 528 via airborne node 520. In this manner, remote ground based node 316 maintains positive communication with airborne entity 458.

FIG. 6

Figure 6:
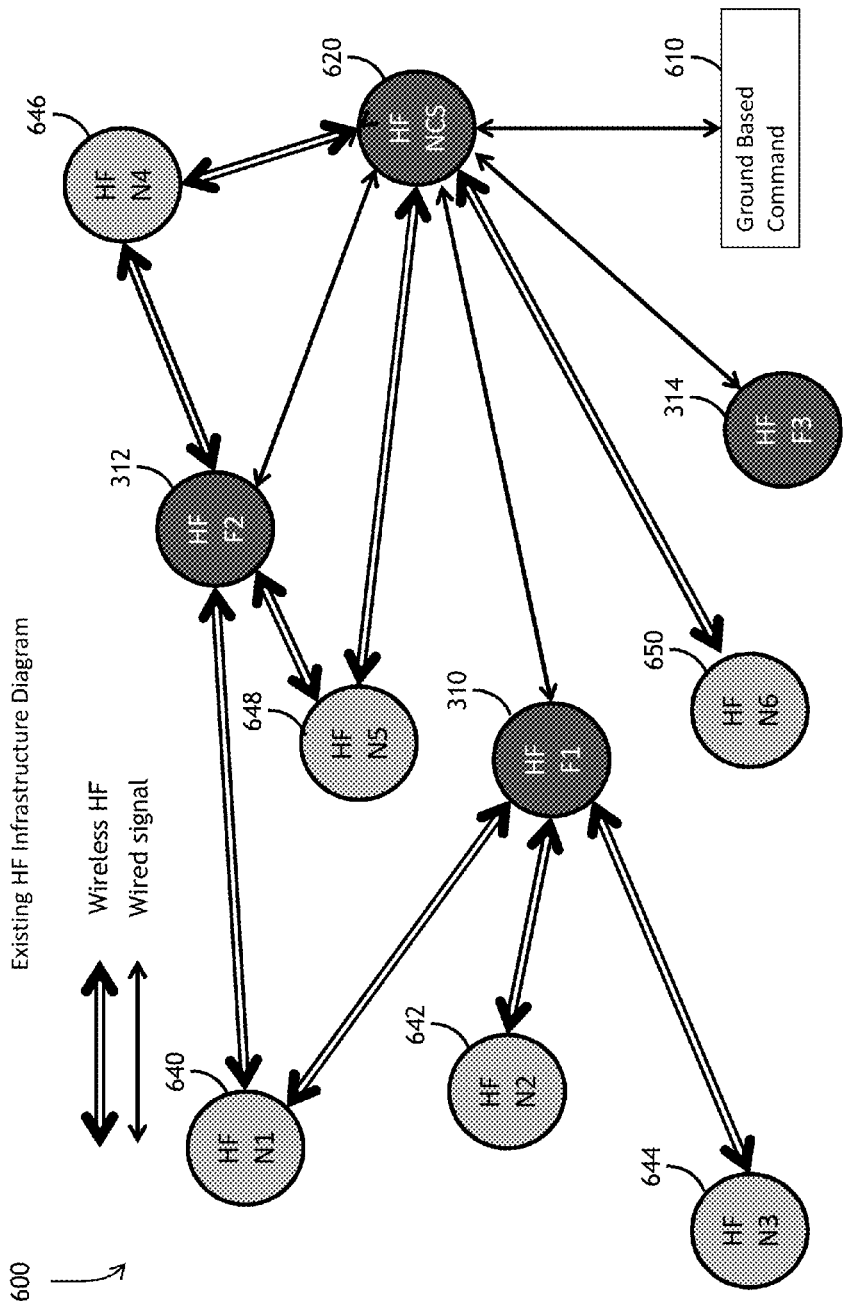
FIG. 6 is a diagram of an exemplary HF network infrastructure usable by one embodiment of the present invention.

Referring to FIG. 6, a diagram of an exemplary HF network infrastructure usable by one embodiment of the present invention is shown. Ground based nodes 310 312 314 may be indicated here as nodes F1 310, F2 312 and F3 314. Each of these nodes may be connected via a wired communication link to a network control station (NCS) 620 which may receive wired signals from a ground based command 610. In embodiments, system 100 may direct such a network based on a one hop wireless RF communication link between each of the ground based nodes 310-316 and airborne nodes N1 640, N2 642, N3 644, N4 646, N5 648, and N6 650.

Current HF Operation

System 100 may direct operation of a one hop network. Within this one hop network, airborne nodes 640-650 may wirelessly communicate as indicated with each respective ground based node 310-314. Some nodes may communicate with more than one station. For example, Node 4 646 may communicate with both F2 312 and NCS 620. One example of a one hop network may include a High Frequency Global Communications System (HFGCS) capable of worldwide communication.

FIG. 7

Referring to FIG. 7, a connectivity matrix indicating exemplary node communication status created by one embodiment of the present invention is shown. A connectivity matrix for Node1 may include each of the nodes and the available connectivity between node 1 and the nodes. Session manager 140 may direct Ad-hoc HF to create a matrix of nodes available to Node 1 for HF connectivity.

In one embodiment, the ad-hoc routing module 130 may create an HF network connectivity map. An instantiation of a one hop network map include:
   a. Node Id
   b. Frequency
   c. Node Type
   d. Relay Node
   e. Relay Node Type, and
   f. Channel Quality.

For example, Node1 may communicate with Node6 via Node 3 as the relay using frequency X2. In this manner, Node1 (airborne) may maintain HF connectivity with Node6 (airborne) for air to air communication.

FIG. 8

Figure 8:
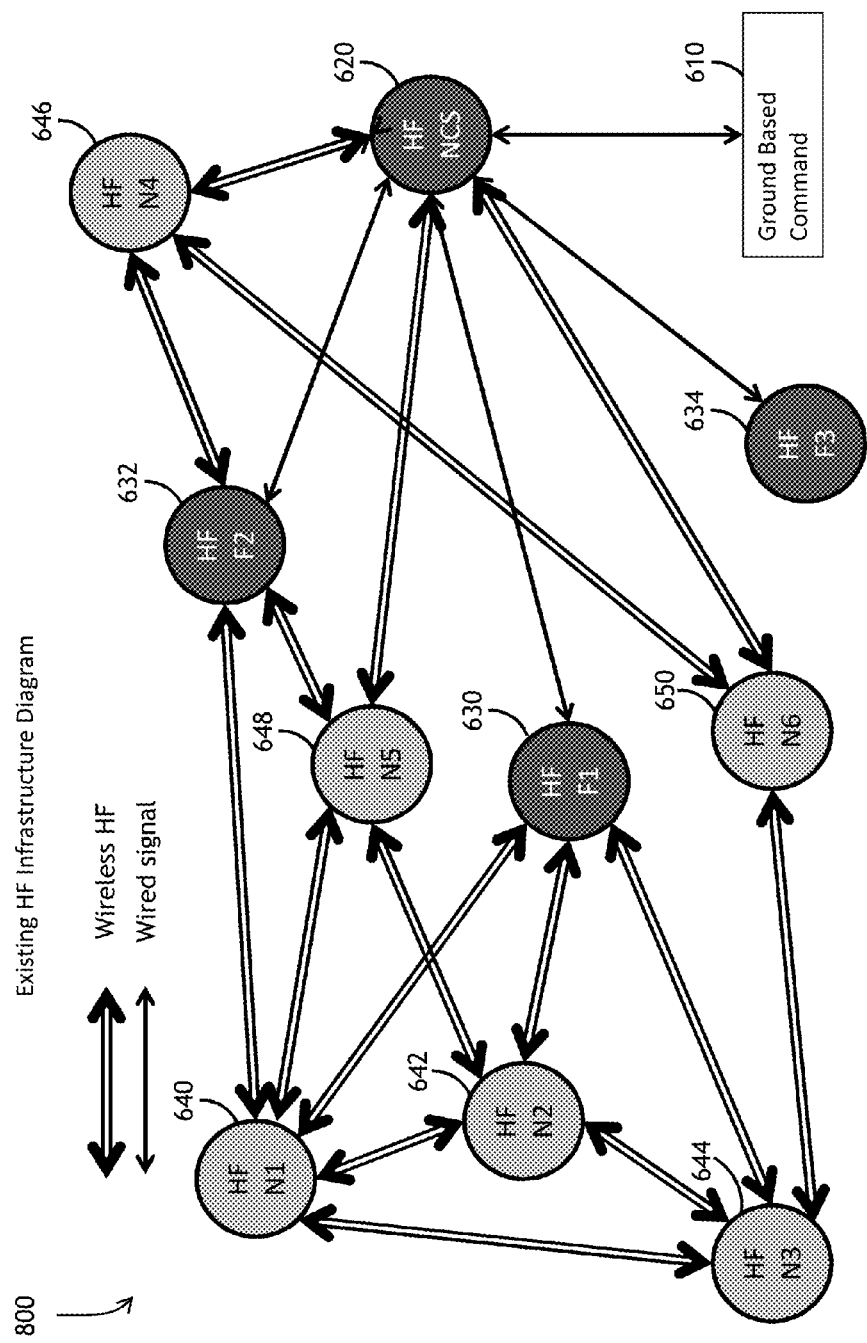
FIG. 8 is a diagram of an alternate HF network infrastructure created by one embodiment of the present invention.

Referring to FIG. 8, a diagram of an alternate HF network infrastructure created by one embodiment of the present invention is shown. System 100 may provide connectivity between nodes of all types and locations via ad-hoc HF routing module 130. Each of the available nodes is able to communication via another of the available nodes to relay a message from node to node.

Ad-Hoc Relay-Hop Routing

In one embodiment, system 100 may support two or more hop sessions using intermediate relay nodes. However, one embodiment may prioritize one-hop communication over relay-hop communication to ensure system 100 continuously maintains local connectivity. In additional embodiments, system 100 may prioritize relay-hop communication using HFGCS nodes as relays over less capable nodes like airborne, man pack etc.

Additionally, system 100 may order sounding messages from neighboring nodes based on signal quality. In this manner, session manager 140 may use the frequency with the best signal quality to initiate a session.

One control 102 input may include an Emissions Control (EMCON) to eliminate all RF transmission for covert operations. When radio silence or EMCON mode is invoked, the HF waveform may cease most transmissions including sounding. In one embodiment, session manager 140 may add/delete manual entries to/from the connectivity matrix to support EMCON Nodes where paths to EMCON Nodes may be added or deleted. In these situations, a sounding acknowledgement will not be expected from an EMCON Node.

Path Determination

When the user sends a session request to a specific call sign:
   a. Session manager 140 may direct the waveform 110 to transmit via a one hop, two hop, or relay-hop path to the specified node assigned to the call sign
   b. If the node id exists in the connectivity matrix a session is established for bi-directional communication
   c. If a path the specified node id does not exist in the connectivity matrix, the HF session manager 140 will initiate node search session.

In embodiments, system 100 may direct session manager 140 to maintain a continuous stream of nodes from the first station to the second station. For example, each day near 2300 UTC, the North Atlantic has a continuous stream of aircraft flying east from the US to Europe while the opposite occurs each day near 1100 UTC. Each of these aircraft may act as a single node in a HF communication link across the ocean. With system 100 onboard each aircraft maintaining the list of one-hop nodes available to it, each node becomes an available communication link in the continuous stream of HF communication between nodes desiring HF communication in the North Atlantic Theater of operations.

HF Session Management

System 100 may operate in a plurality of nodes. Exemplary modes of operation may include 1) Idle Mode, and 2) Session Mode as described above. In the Idle Mode, the HF Session Manager 140 may direct $A^2LE$ to:
   a. listen for A2LE Call (start of a new session)
   b. listen for Sounding Messages (potential relay nodes)
   c. send out A2LE call to begin session initiation.

Each periodic Sounding 136 Message may contain the call sign of the HF Node for identification. In embodiments, every HF node may send out sounding messages to determine available nodes within one-hop of the sending node. In this manner, each node may employ other nodes of a variety of type (airborne, man pack, maritime, Fixed Site and HFGCS) for use as a relay node. In embodiments, each node generated periodic sounding 136 message may include the Node Type—airborne, fixed site, man pack, maritime, and HFGCS so $A^2LE$ may report the sounding message to the Ad-hoc Routing Module 130.

In one embodiment, history 138 may maintain a stored list of all nodes session manager 140 deemed available within a configurable period. For example, session manager 140 may be directed to store all available nodes from which a sounding message was received within the last hour. In this manner, the Ad-hoc Routing module 130 may create a network connectivity map as it maintains a current list of direct and one-hop neighbors.

Ad-Hoc Path Management

The Ad-hoc Routing module 130 may receive periodic sounding 136 message reports from the $A^2LE$ node finding module 122. The sounding message report may preferable store the following information:
   a. Node Id: Call Sign of the node that sent the sounding message
   b. Frequency: Frequency on which the sounding message was received
   c. Signal Quality: A quality metric used to evaluate the HF channel quality and available bandwidth
   d. Node Type: Is the reporting node airborne, fixed site, man pack, maritime, or HFGCS
   e. List of Node Id: List of nodes the sounding radio has heard in the last hour (configurable period)

FIG. 9

Figure 9:
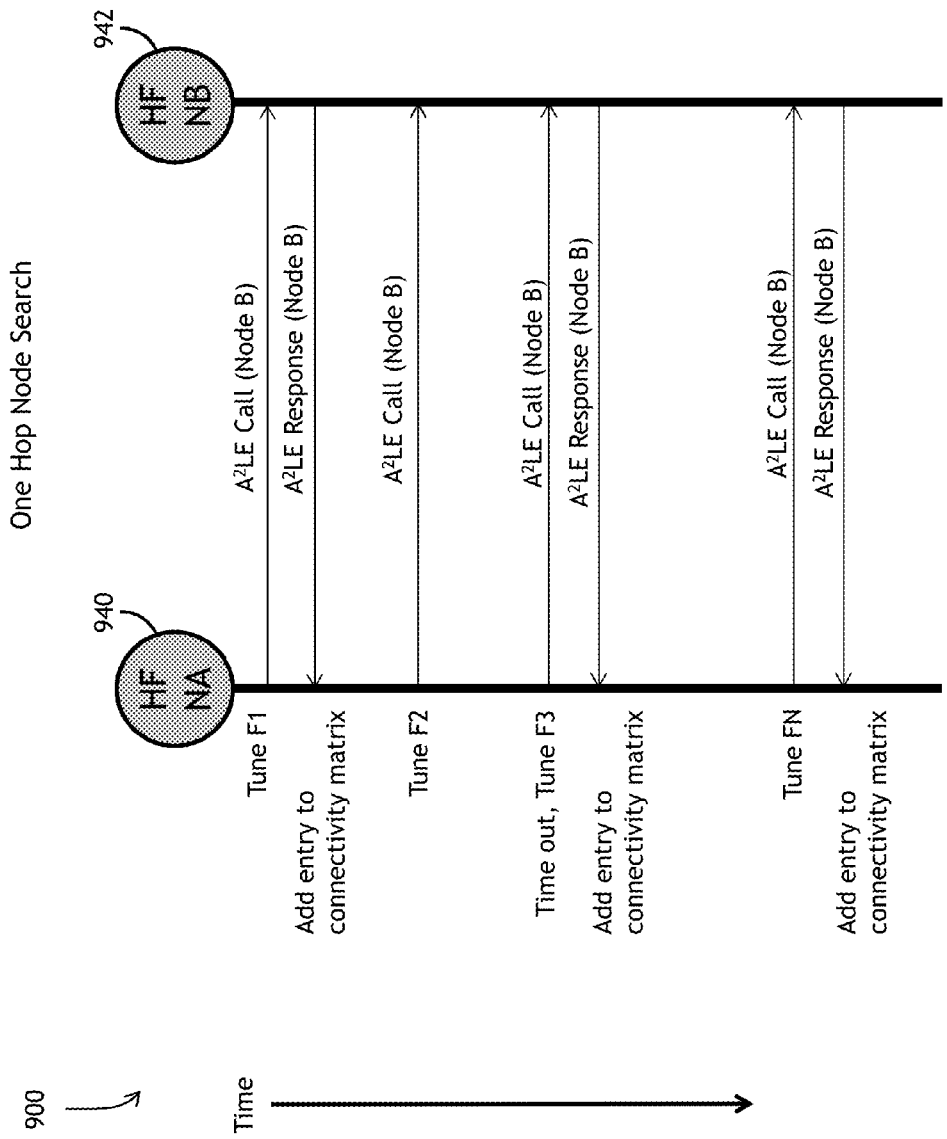
FIG. 9 is a diagram of a one hop node search exemplary of one embodiment of the present invention.

Referring to FIG. 9, a diagram of a one hop node search exemplary of one embodiment of the present invention is shown. Session manager 140 may initiate a one-hop node search all frequencies in the frequency table:
   a. Send A2LE Call
   b. Wait for A2LE Response
   c. Order Responses from node based on signal quality of frequencies
   d. Select best frequency and establish a session for bi-directional communication
   e. If no responses received on all frequencies option exists to perform two-hop node search
   f. Send proxy A2LE call to all nodes in connectivity matrix Preferably, each node in the connectivity matrix may initiate a node search session to expand the connectivity matrix to include distant nodes. In this manner, system 100 may expand the region of search for the node to one-hop or two-hop neighbors.

If proxy A²LE response is received, session manager 140 may select the best frequency to the relay node and establish a relay-hop session for bi-directional communication.

Method steps for a one hop node search from NodeA 940 may include:

a. Tuning frequency 1
    b. Initiate an A²LE call to NodeB 942
    c. Receive an A²LE response from NodeB 942
    d. Add entry to the connectivity matrix NodeA 940 may methodically continue with this process to determine available frequencies to communicate with NodeB 942. In one embodiment, frequency 1 may include a hailing frequency used for initial contact between nodes where actual communication may occur on a second frequency.

FIG. 10

Figure 10:
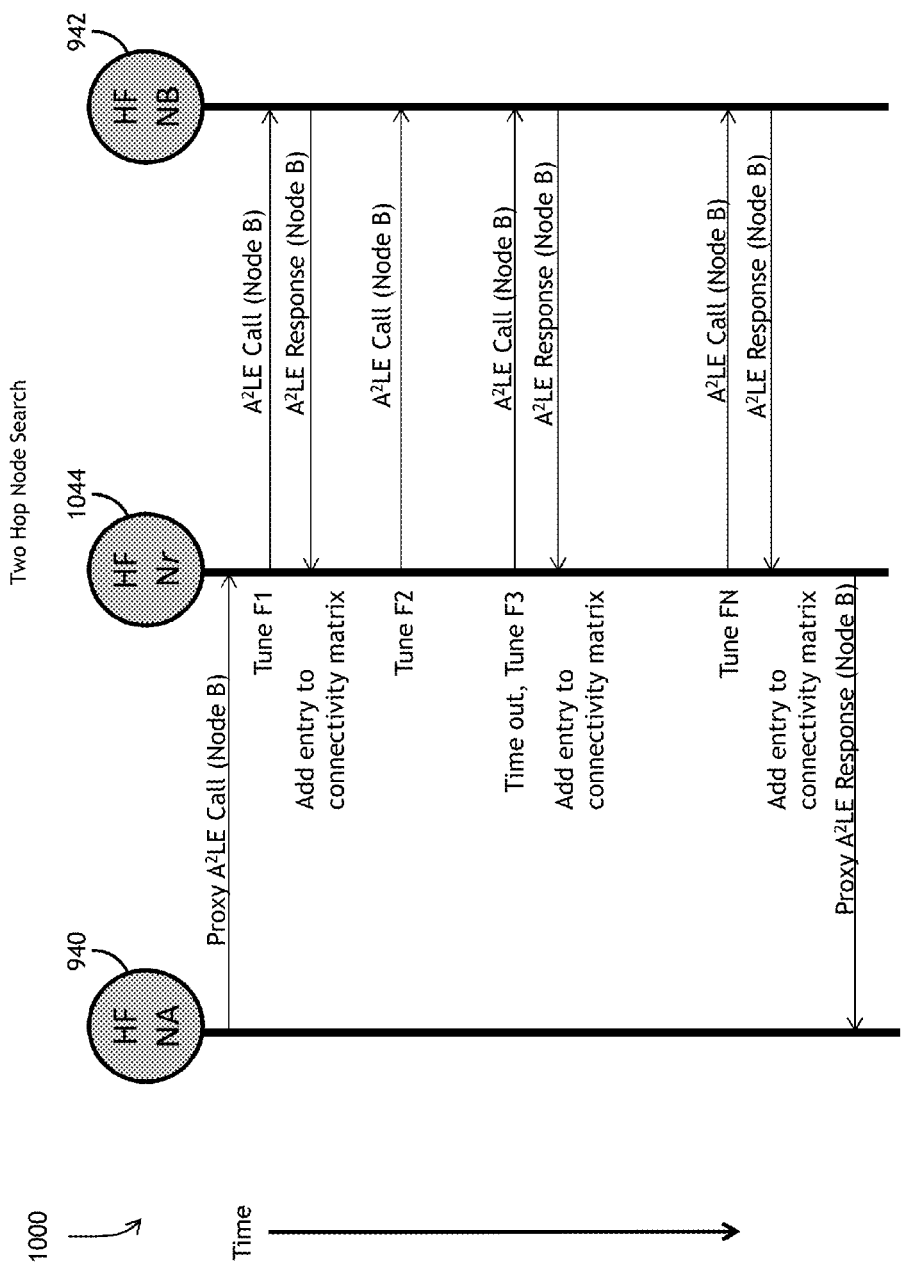
FIG. 10 is a diagram of a two hop node search exemplary of one embodiment of the present invention.

Referring to FIG. 10, a diagram of a two hop node search exemplary of one embodiment of the present invention is shown. A two-hop node search may include additional steps of a proxy call from NodeA 940 to the relay Node r 1044. Node r 1044 may carry out similar steps as found in the one-hop node search and report the information to NodeA 940.

FIG. 11

Figure 11:
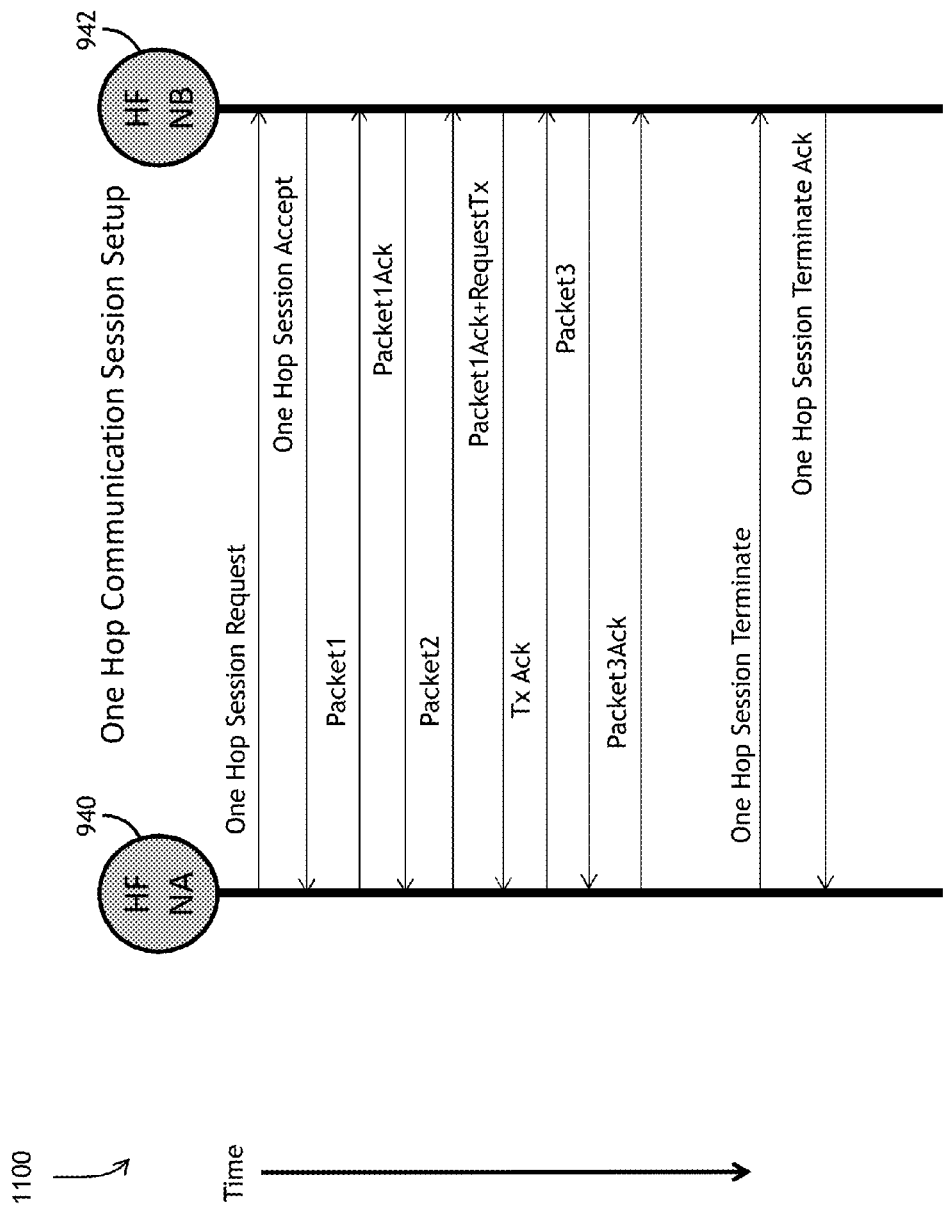
FIG. 11 is a diagram of a one hop communication session setup in accordance with one embodiment of the present invention.

Referring to FIG. 11, a diagram of a one hop communication session setup in accordance with one embodiment of the present invention is shown. Preferably, the one hop session may include the session request and acknowledgement followed by packet transfer between each node. A session terminate message may conclude the session.

FIG. 12

Figure 12:
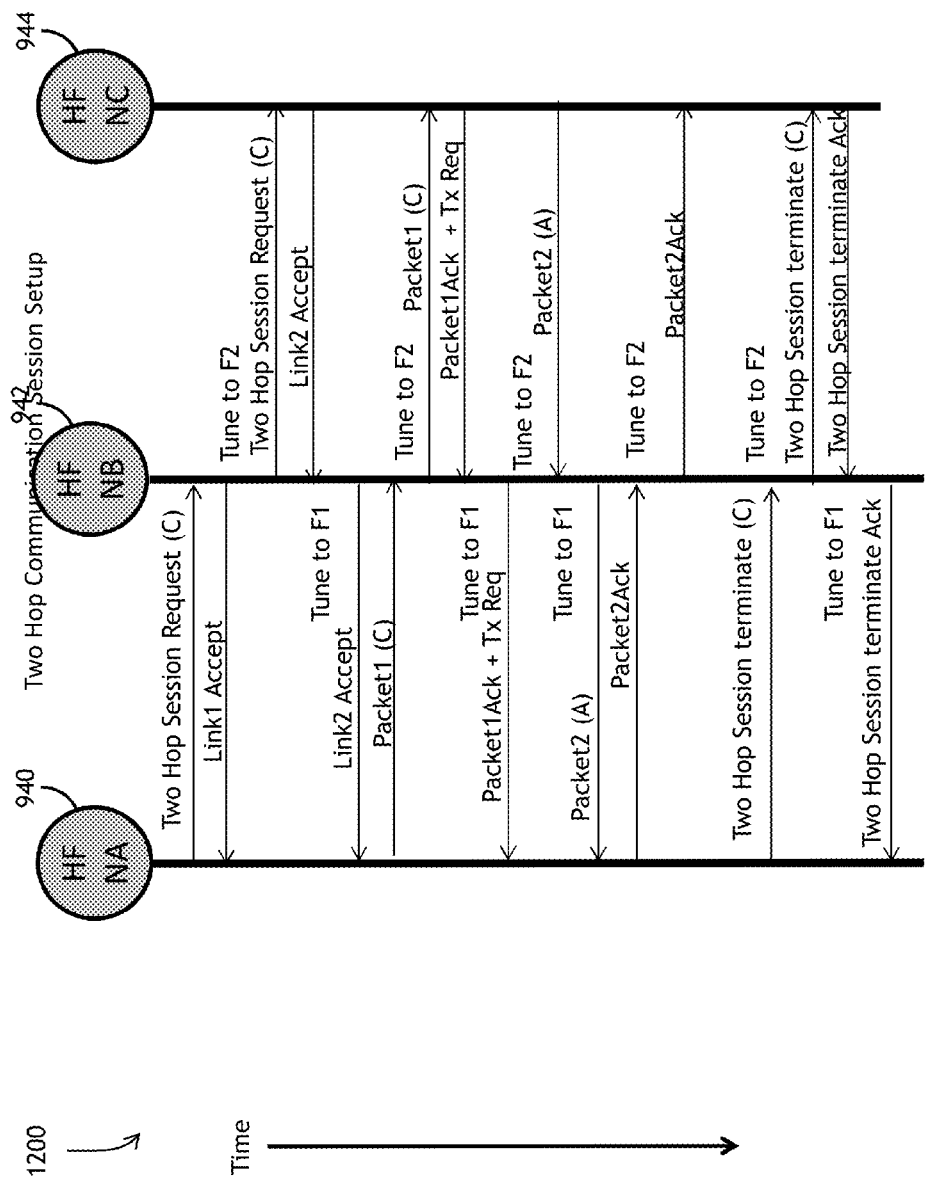
FIG. 12 is a diagram of a two hop communication session setup in accordance with one embodiment of the present invention.

Referring to FIG. 12, a diagram of a two hop communication session setup in accordance with one embodiment of the present invention is shown. A two-hop session may include the further step of a communication link acceptance between each outside node (here NodeA 940 and NodeC 944) and the relay node NodeB 942. Once the communication link has been established, the packetized information may bi-directionally flow from NodeA 940 to NodeC 944 via NodeB 942.

Link Management

The connectivity map may be temporary so after some period dependent the location of the nodes, motion of the nodes, atmospheric conditions, time of day etc. the communication link will begin to degrade and will eventually break. In one embodiment, a configurable link break timer may operate as a conservative estimate of the predicted duration of the viable communication link. System 100 may use a conservative estimate for session reestablishment before session break. For example, the link break timer may be set based on mission environment. For example:

a. Normal operations (60-90 minutes)
    b. Solar Flare/CME (40-60 minutes)
    c. Nuclear Effects (5-15 minutes)

When the link break timer expires, each session manager 140 associated with each of the connected nodes proceeds into a communication link reestablishment mode. In one embodiment, the session managers 140 may cycle through each of the frequencies in their frequency table and select the best frequency available to them to continue based on signal quality metric. Additionally, each session manager 140 may reduce the data rate of throughput to attempt to maintain the current communication link while searching for a new communication link. This poly-dimensional attempt at communication link maintenance during communication link search may allow system 100 to maintain the communication link.

In one embodiment, session manager 140 may sequentially proceed through a communication link reestablishment procedure for all hops in a relay-hop session with the expiry on any link break timer. Alternatively, session manager 140 may target a single communication link in a relay-hop session for reestablishment since all hops in a relay-hop session may not fail at the same time so each separate hop in a relay-hop session may independently perform communication link reestablishment as needed.

FIG. 13

Figure 13:
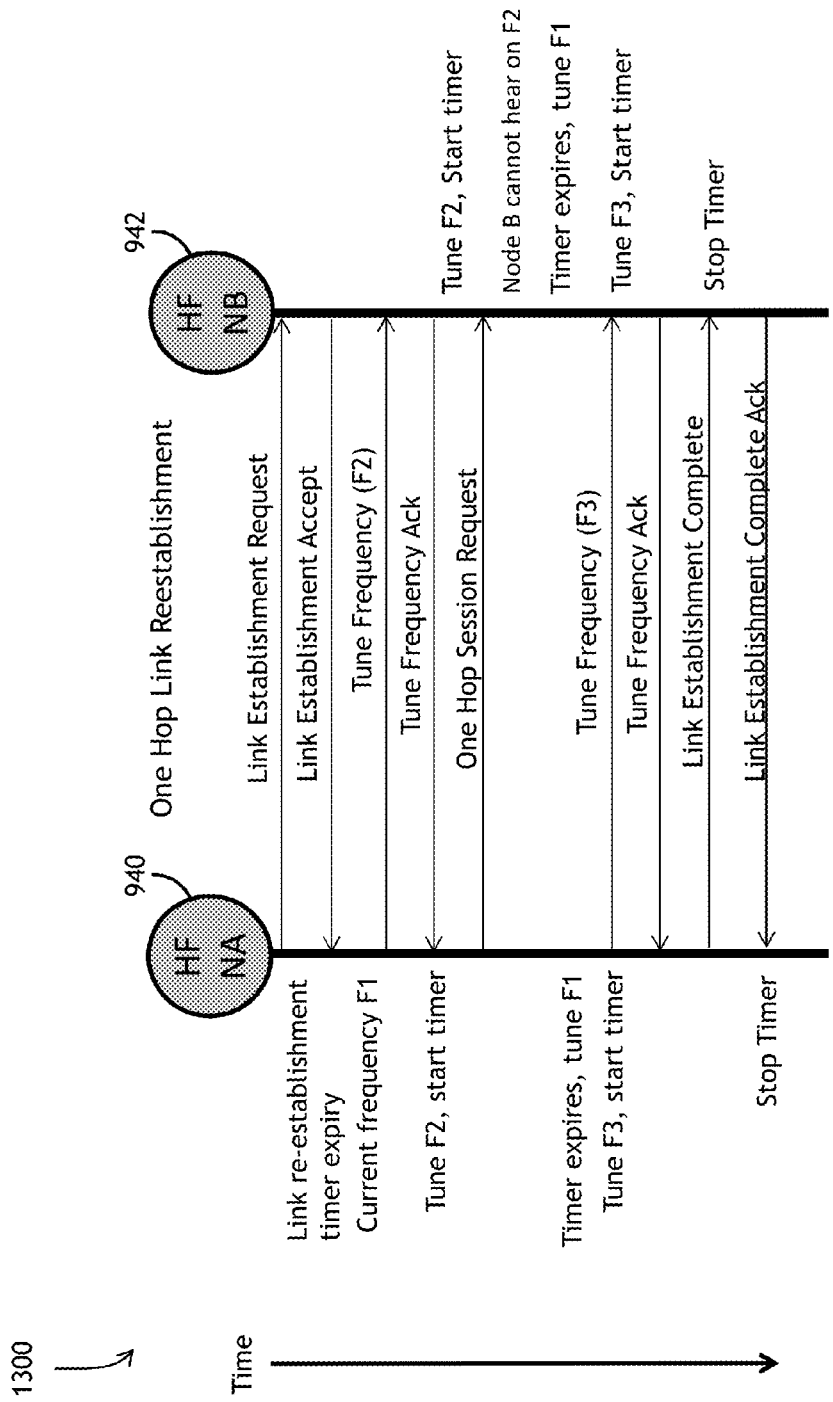
FIG. 13 is a diagram of a one hop communication link reestablishment in accordance with one embodiment of the present invention.

Referring to FIG. 13, a diagram of a one hop communication link reestablishment in accordance with one embodiment of the present invention is shown. Similar to the initial communication link establishment, a reestablishment may operate to quickly regain the communication link.

FIG. 14

Figure 14:
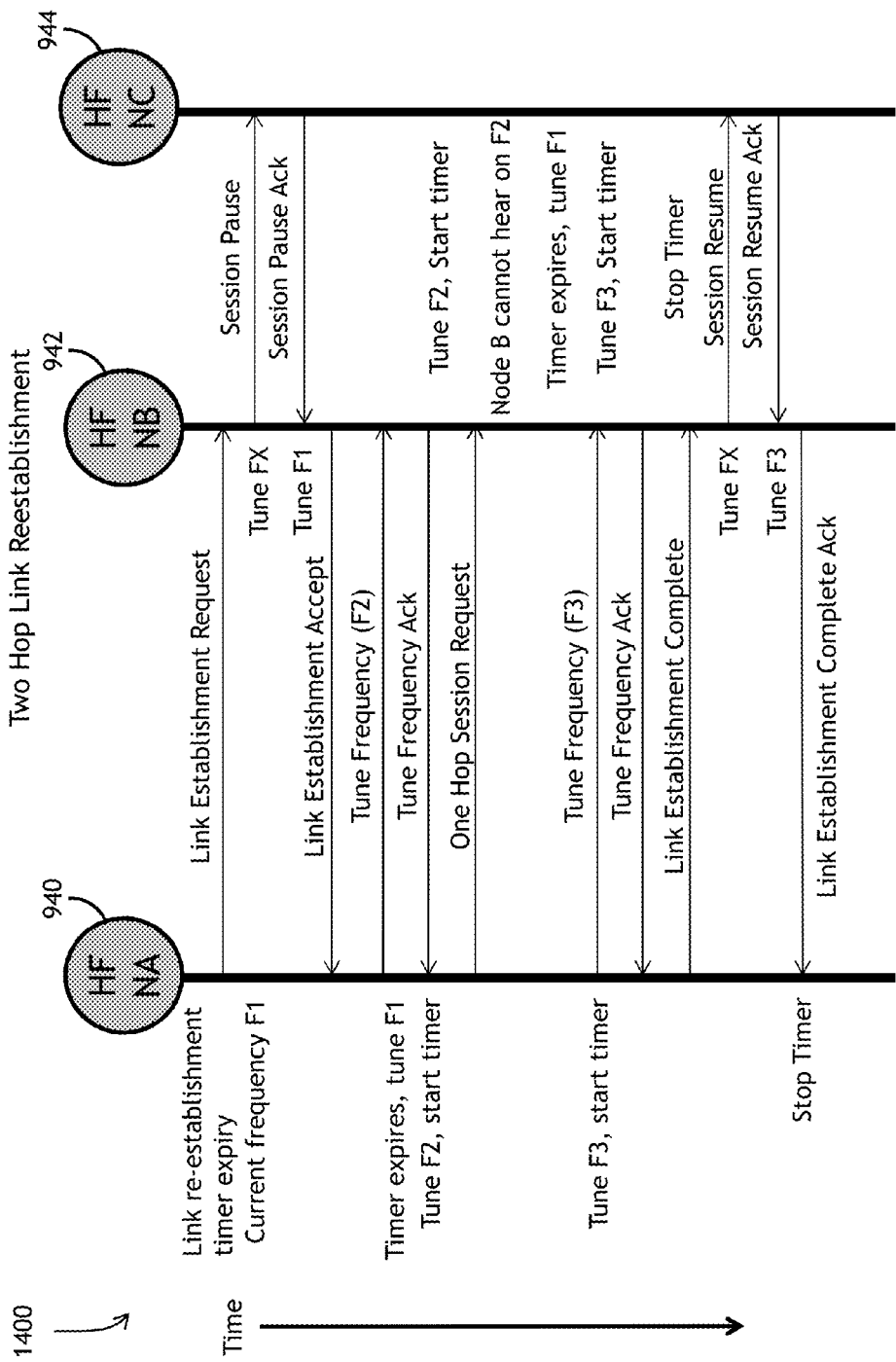
FIG. 14 is a diagram of a two hop communication link reestablishment in accordance with one embodiment of the present invention.

Referring to FIG. 14, a diagram of a two hop communication link reestablishment in accordance with one embodiment of the present invention is shown. When one of the communication links in a two-hop communication initiates a communication link establishment session, the relay node may inform the other recipient of the session.

One possibility may include a situation where, prior to the expiration of the link break timer, the SNR of the current communication link may deteriorate. In this case, the node detecting the communication link deterioration will initiate a communication link reestablishment session. In one embodiment, session manager 140 may set a SNR threshold below which the session manager 140 may initiate a communication link reestablishment session.

Should the communication link unexpectedly break, session manager 140 may receive an indication from the waveform indicating a lack of a communication link. Here, session manager 140 may delay the waveform to ensure that the peer node has also determined that it is a communication link break condition. Once the delay is met, HF Session Manager 140 may reestablish the communication link via discovery of a new path. One goal of system 100 may include a transparent communication link repair without a user notification. Once the communication link has been repaired, system 100 may inform the operator that the communication link has been reestablished.

Message Store and Forward

In embodiments, the half-duplex relay nodes in a relay-hop communication network may operate in a store and forward mode. The session management protocol may allow the relay node to switch between two sessions without losing data relay.

FIG. 15AB

Figure 15A:
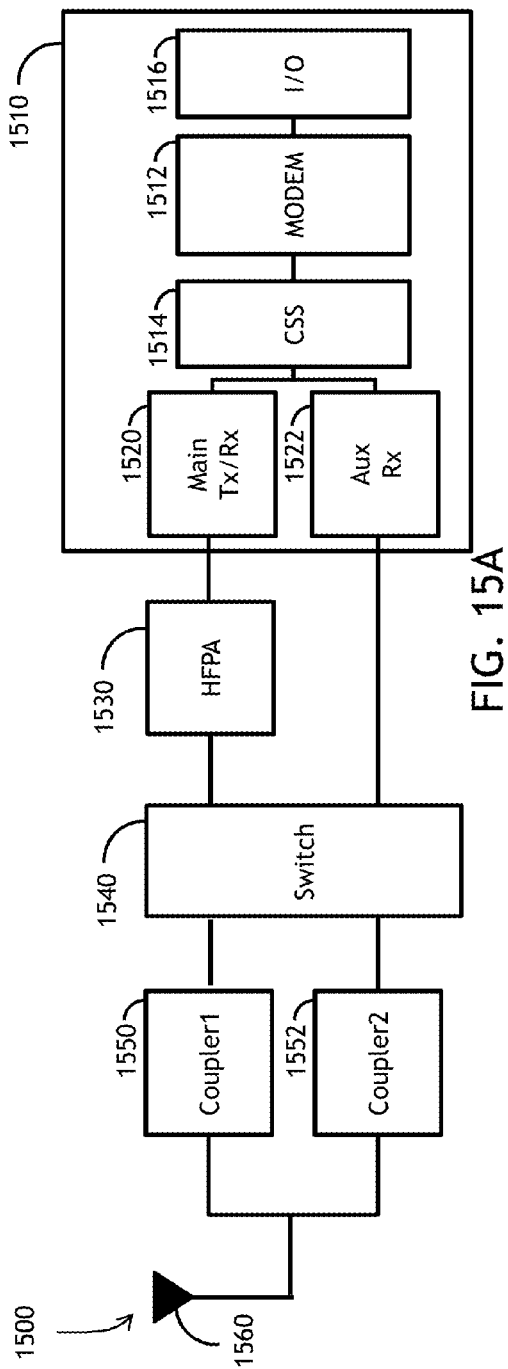
FIGS. 15A and 15B are diagrams of exemplary hardware architecture for ad-hoc HF in accordance with one embodiment of the present invention.
Figure 15B:
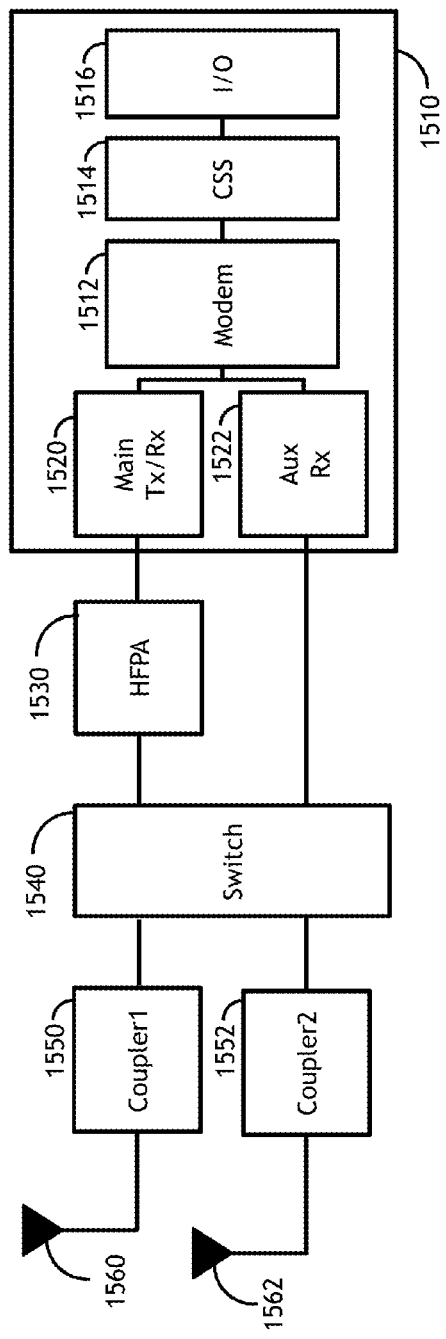

Referring to FIGS. 15A and 15B, diagrams of exemplary hardware architecture for ad-hoc HF in accordance with one embodiment of the present invention is shown. HF radio system 1510 may include Crypto Sub System (CSS) 1514 Modem 1512 and main transmitter receiver 1520. The transmission signal may then flow through a power amplifier 1530, a switch 1540, and the couplers 1550 1552 to the antennas 1560 1562. In one embodiment shown in FIG. 15A, system 100 may employ a Central Switching System CSS may route signals between the radio equipment and the modem equipment.

Aux Receiver

Limited physical space on some nodes (e.g., aircraft) may preclude simultaneous transmission and reception via a transmitter distally separate from the receiver. In these cases, system 100 may incorporate a separate auxiliary receiver 1522 to enable continuous reception from a plurality of nodes simultaneous with transmission to a plurality of nodes.

FIG. 16

Figure 16A:
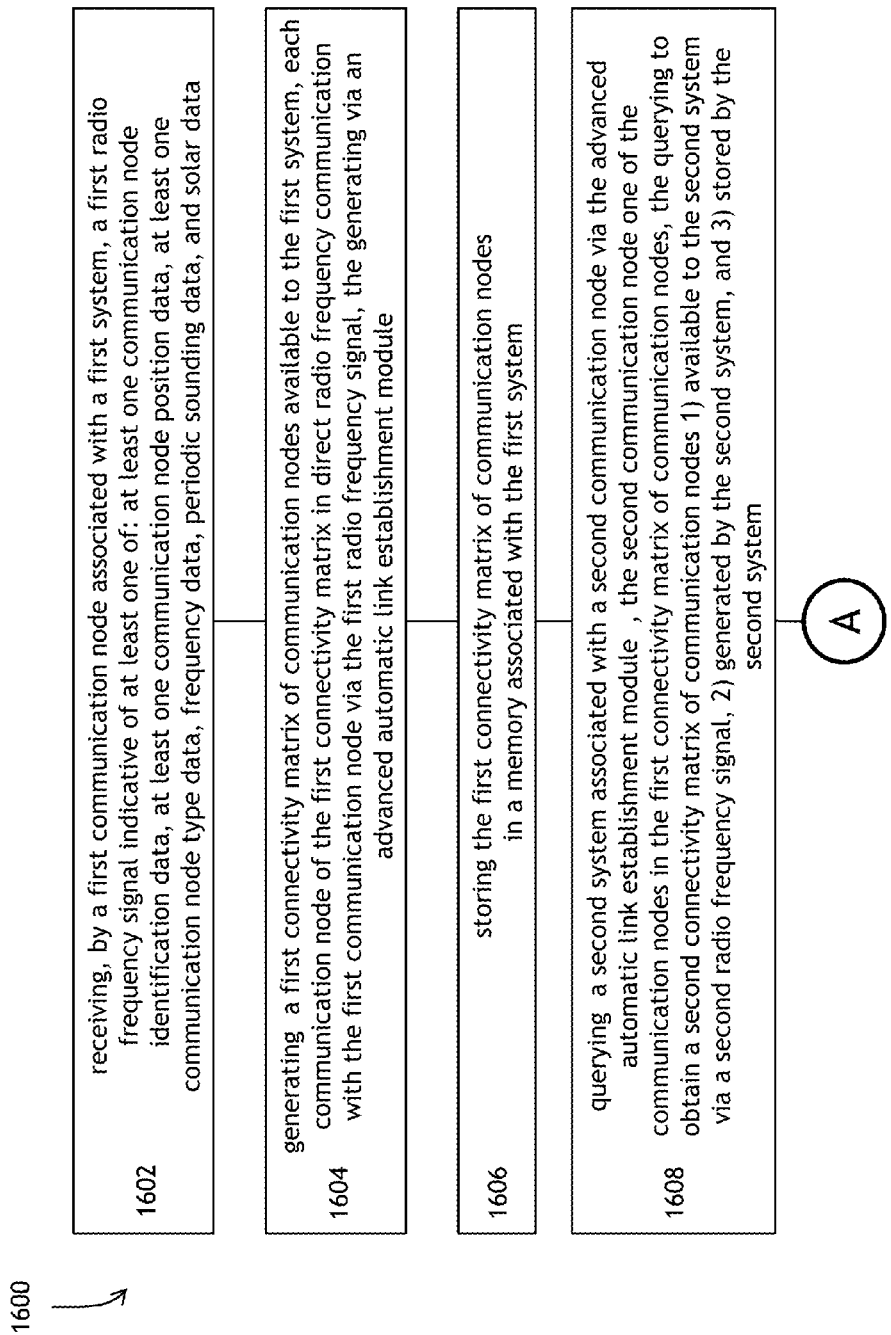
FIGS. 16A and 16B represent a flow diagram of a method for ad-hoc HF exemplary of an embodiment of the present invention.
Figure 16B:
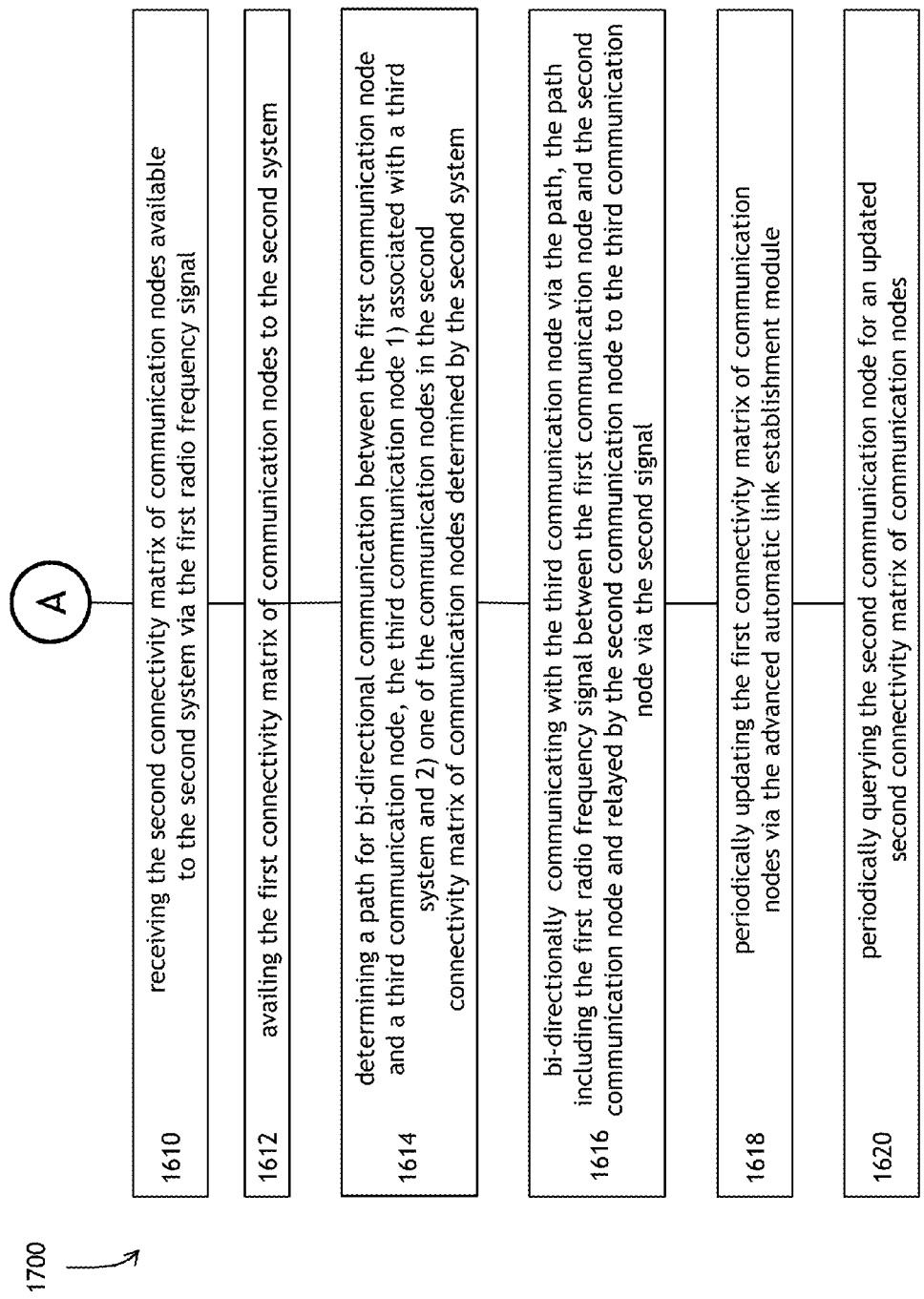

Referring to FIGS. 16A and 16B, a flow diagram of a method for ad-hoc HF exemplary of an embodiment of the present invention is shown. Method 16 may begin, at step 1602, with receiving, by a first communication node associated with a first system, a first high frequency radio frequency signal indicative of at least one of: at least one communication node identification data, at least one communication node position data, at least one communication node type data, frequency data, periodic sounding data, and solar data.

Method 1600 may continue at step 1604 with generating a first connectivity matrix of communication nodes available to the first system, each communication node of the first connectivity matrix is in direct radio frequency communication with the first communication node via the first high frequency radio frequency signal, the generating via an advanced automatic link establishment module. At step 1606 method 1600 may store the first connectivity matrix of communication nodes in a memory associated with the first system in a memory associated with the system. After storage, the method may query a second system at step 1608, the second system associated with a second communication node. The query via the advanced automatic link establishment module, the second communication node one of the communication nodes in the first connectivity matrix of communication nodes, the querying to obtain a second connectivity matrix of communication nodes 1) available to the second system, 2) generated by the second system, and 3) stored by the second system. The second system may generate its second connectivity matrix in a similar manner as did the first system.

Method 1600 may continue at step 1610 with receiving the second connectivity matrix of communication nodes available to the second system via the first high frequency radio frequency signal. At step 1612 method 1600 may make available to other communication nodes the first connectivity matrix of communication nodes. At step 1614, method 1600 may determine a path for bi-directional communication between the first communication node and a third communication node, the third communication node 1) associated with a third system and 2) one of the communication nodes in the second connectivity matrix of communication nodes determined by the second system.

Method 1600 may continue at step 1616 with bi-directionally communicating with the third communication node via the path, the path including the first high frequency radio frequency signal between the first communication node and the second communication node and relayed by the second communication node to the third communication node via the second high frequency signal. One communication is established, method 1600 may periodically update, at step 1618, the first connectivity matrix of communication nodes via the advanced automatic link establishment module; and at step 1620 periodically query the second communication node for an updated second connectivity matrix of communication nodes.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communication device (e.g., a modem, communication switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communication device (e.g., a modem, communication switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B".

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method for ad-hoc beyond line of sight radio frequency communication, comprising:
   receiving, by a first communication node associated with a first system, a first radio frequency signal indicative of at least one of communication node identification data, communication node position data, communication node type data, frequency data, periodic sounding data, or solar data;
   generating a first connectivity matrix of communication nodes available to the first system, each communication node in the first connectivity matrix in direct radio frequency communication with the first communication node via the first radio frequency signal, the generating via an advanced automatic link establishment module;
   storing the first connectivity matrix in a memory associated with the first system;
   querying a second system associated with a second communication node via the advanced automatic link establishment module, the second communication node being one of the communication nodes in the first connectivity matrix, the querying to obtain a second connectivity matrix of communication nodes 1) available to the second system via a second radio frequency signal, 2) generated by the second system, and 3) stored by the second system;
   updating the first connectivity matrix based on the obtained second connectivity matrix;
   availing the first connectivity matrix to the second system;
   determining a path for bi-directional communication between the first communication node and a third communication node, the third communication node being one of the communication nodes in the second connectivity matrix;
   bi-directionally communicating with the third communication node via the path, the path including the first radio frequency signal between the first communication node and the second communication node and relayed by the second communication node to the third communication node via the second signal;
   periodically updating the first connectivity matrix via the advanced automatic link establishment module; and
   periodically querying the second communication node for an updated second connectivity matrix via the advanced automatic link establishment module.

2. The method for ad-hoc beyond line of sight radio frequency communication of claim 1, wherein each connectivity matrix of communication nodes further comprises a node identification, a node connection frequency, a node type, a router type, and an indicator of node capability.

3. The method for ad-hoc beyond line of sight radio frequency communication of claim 1, wherein the first system associated with a first communication node is further configured to transmit and receive the first radio frequency signal via a transmitter receiver and to process the received first radio frequency signal via a session manager.

4. The method for ad-hoc beyond line of sight radio frequency communication of claim 1, wherein the first radio frequency signal is a signal configured for beyond line of sight propagation and comprises one of a high frequency signal or a very low frequency signal.

5. The method for ad-hoc beyond line of sight radio frequency communication of claim 1, wherein the advanced automatic link establishment module operates on a time shared basis with the first communication node.

6. The method for ad-hoc beyond line of sight radio frequency communication of claim 1, wherein the advanced automatic link establishment module operates while the first communication node is idle.

7. The method for ad-hoc beyond line of sight radio frequency communication of claim 1, wherein the first radio frequency signal is routed via a first transmitter receiver and the second radio frequency signal is received via a second receiver.

8. The method for ad-hoc beyond line of sight radio frequency communication of claim 1, wherein periodically updating the first connectivity matrix is based on at least one of node speed, node relative sun speed, a determined presence of a radio frequency propagation inhibitor, or an indication of signal degradation.

9. The method for ad-hoc beyond line of sight radio frequency communication of claim 1, further comprising:
   monitoring a quality of the bi-directional communication with the third communication node;
   determining a reduction in the quality based on at least one of a package error rate and a message error rate;
   determining an alternate path for bi-directional communication with the third communication node via the advanced automatic link establishment module before the quality of the bi-directional communication with the third communication node reaches a threshold; and
   bi-directionally communicating with the third communication node via the alternate path.

10. A system for ad-hoc beyond line of sight radio frequency communication, comprising:
   a first communication node associated with a first system, the first communication node including a transmitter receiver configured for transmission and reception of a first radio frequency signal;
   a node finding module associated with the first system, the node finding module configured for determining communication nodes available to the first system, the communication nodes being in direct communication with the first communication node via the first radio frequency signal, the determining including receiving, via the first radio frequency signal, at least one of node identification data, node position data, node type data, frequency data, periodic sounding data, or solar data associated with communication nodes available to the first system;

an advanced automatic link establishment module associated with the first system, the advanced automatic link establishment module configured for:

generating a first connectivity matrix of communication nodes available to the first system based on data received from the node finding module, querying a second system associated with a second communication node, the second communication node being one of the communication nodes in the first connectivity matrix, the querying to obtain a second connectivity matrix of communication nodes 1) available to the second system, 2) generated by the second system, and 3) stored by the second system, each node of the second connectivity matrix being in direct radio frequency communication with the second communication node via a second radio frequency signal, the second connectivity matrix based on receiving, via the second radio frequency signal, at least: node identification data, node position data, node type data, frequency data, periodic sounding data, and solar data associated with each node in the second connectivity matrix;

updating the first connectivity matrix based on the second connectivity matrix, availing the first connectivity matrix to the second system;

a memory configured at least for receiving and storing the first connectivity matrix and the second connectivity matrix;

an ad-hoc routing module for determining a path for bi-directional communication between the first communication node and a third communication node, the third communication node being one of the communication nodes in the second connectivity matrix;

a waveform module for bi-directionally communicating with the third communication node via the path, the path including the first radio frequency signal between the first communication node and the second communication node and relayed by the second communication node to the third communication node via the second signal; and a session manager for periodically querying the second communication node for an updated second connectivity matrix of communication nodes and periodically updating the first connectivity matrix of communication nodes via the advanced automatic link establishment module.

11. The system for ad-hoc beyond line of sight radio frequency communication of claim 10, wherein each connectivity matrix of communication nodes further comprises a node identification, a node connection frequency, a node type, a router type, and an indicator of node capability.

12. The system for ad-hoc beyond line of sight radio frequency communication of claim 10, wherein the first radio frequency signal is a signal configured for beyond line of sight propagation and comprises one of a high frequency signal or a very low frequency signal.

13. The system for ad-hoc beyond line of sight radio frequency communication of claim 10, wherein the first communication node further comprises an electronically scanned array antenna element.

14. The system for ad-hoc beyond line of sight radio frequency communication of claim 10, wherein the advanced automatic link establishment module operates on a time shared basis with the first communication node.

15. The system for ad-hoc beyond line of sight radio frequency communication of claim 10, wherein the advanced automatic link establishment module operates while the first communication node is idle.

16. The system for ad-hoc beyond line of sight radio frequency communication of claim 10, wherein the first communication node further comprises a first transmitter receiver for routing the first radio frequency signal and an auxiliary receiver for receiving the second radio frequency signal.

17. The system for ad-hoc beyond line of sight radio frequency communication of claim 10, wherein periodically updating the first connectivity matrix is based on at least one of node speed, node relative sun speed, a determined presence of a radio frequency propagation inhibitor, or an indication of signal degradation.

18. The system for ad-hoc beyond line of sight radio frequency communication of claim 10, wherein each communication node further comprises a first transmitter receiver element configured for transmission and reception and a second receiver element configured for reception.

19. The system for ad-hoc beyond line of sight radio frequency communication of claim 10, wherein the session manager is further configured for:

monitoring a quality of bi-directional communication with the third communication node;

determining a reduction in the quality based on at least one of a package error rate or a message error rate;

determining an alternate path via the advanced automatic link establishment module before the signal quality of the bi-directional communication with the third communication node reaches a threshold; and modifying the path associated with bi-directional communication with the third communication node to the alternate path via the waveform module.

20. A system for ad-hoc beyond line of sight radio frequency communication, comprising:

a first communication node associated with a first system, the first communication node including a transmitter receiver configured for transmission and reception of a first radio frequency signal;

a node finding module associated with the first system, the node finding module configured for determining communication nodes available to the first system, the determining including receiving at least one of node identification data, node position data, node type data, frequency data, periodic sounding data, or solar data associated with the communication nodes available to the first system;

an advanced automatic link establishment module associated with the first system, the advanced automatic link establishment module configured for:

generating a first connectivity matrix of communication nodes available to the first system based on data received from the node finding module, the first connectivity matrix comprising a list of one or more paths to the communication nodes available to the first system, the list of one or more paths comprising a list of one or more radio frequency signals associated with bi-directional communication between one or more communication nodes on the one or more paths, querying one or more of the communication nodes in the first connectivity matrix, the querying to obtain one or more additional connectivity matrices associated with the one or more of the communication nodes in the first connectivity matrix, updating the first connectivity matrix based on the one or more additional connectivity matrices, availing the first connectivity matrix to the one or more of the communication nodes in the first connectivity matrix;

a memory configured at least for receiving and storing the first connectivity matrix and the one or more additional connectivity matrices;

an ad-hoc routing module for determining one or more paths for bi-directional communication between the first communication node and a target communication node in the first connectivity matrix;

a waveform module for bi-directionally communicating with the target communication node via the path associated with bi-directional communication between the first communication node and the target communication node; and a session manager for periodically querying one or more of the communication nodes in the first connectivity matrix and periodically updating the first connectivity matrix of communication nodes via the advanced automatic link establishment module.

* * * * *